United States Patent
Ruppin et al.

(10) Patent No.: US 11,936,629 B2
(45) Date of Patent: Mar. 19, 2024

(54) SYSTEM AND METHOD FOR CREATING A SECURE HYBRID OVERLAY NETWORK

(71) Applicant: VMware LLC, Palo Alto, CA (US)

(72) Inventors: Adi Ruppin, Los Altos, CA (US); Elad Rave, Los Altos, CA (US)

(73) Assignee: VMware LLC, Palo Alto, CA (US)

( * ) Notice: Subject to any disclaimer, the term of this patent is extended or adjusted under 35 U.S.C. 154(b) by 241 days.

(21) Appl. No.: 17/127,992

(22) Filed: Dec. 18, 2020

(65) Prior Publication Data

US 2021/0152529 A1 May 20, 2021

Related U.S. Application Data

(63) Continuation-in-part of application No. PCT/US2019/038114, filed on Jun. 20, 2019.

(60) Provisional application No. 62/950,733, filed on Dec. 19, 2019, provisional application No. 62/688,294, filed on Jun. 21, 2018.

(51) Int. Cl.
H04L 9/40 (2022.01)

(52) U.S. Cl.
CPC .......... *H04L 63/0428* (2013.01); *H04L 63/08* (2013.01); *H04L 63/18* (2013.01); *H04L 63/20* (2013.01)

(58) Field of Classification Search
CPC ..... H04L 63/0428; H04L 63/08; H04L 63/18; H04L 63/20
USPC .......................................................... 726/1
See application file for complete search history.

(56) References Cited

U.S. PATENT DOCUMENTS

| | | | |
|---|---|---|---|
| 8,130,671 B2 | 3/2012 | Park et al. | |
| 8,724,513 B2* | 5/2014 | Hardie | H04L 12/4633 370/255 |
| 8,893,259 B2* | 11/2014 | Agarwal | H04L 67/02 713/153 |
| 8,942,238 B2 | 1/2015 | Kano | |
| 9,705,882 B2* | 7/2017 | Chan | H04L 63/0428 |
| 10,574,482 B2 | 2/2020 | Oré et al. | |
| 10,630,505 B2 | 4/2020 | Rubenstein et al. | |

(Continued)

FOREIGN PATENT DOCUMENTS

| | | | |
|---|---|---|---|
| CN | 103168456 A | 6/2013 | |
| EP | 3811590 A1 | 4/2021 | |

(Continued)

OTHER PUBLICATIONS

PCT International Search Report & Written Opinion of International Patent Application PCT/2019/038114, dated Oct. 21, 2019, 10 pages, International Searching Authority (KR).

*Primary Examiner* — Dant B Shaifer Harriman
(74) *Attorney, Agent, or Firm* — Quarles & Brady LLP

(57) ABSTRACT

A system and method for creating a secure overlay network on top of the public Internet, optionally by creating an identity-based network in which user identities are the identifiers rather than IP addresses, and whereas only authenticated and authorized users whose identity has been established have visibility and access to the network; establishing fully encrypted and private network segments; providing superior performance through improved protocols and routing; and implementing a decentralized topology that allows any two nodes on it to communicate regardless of each node's location or network settings—as if the two nodes are on the same local area network.

19 Claims, 21 Drawing Sheets

(56) References Cited

U.S. PATENT DOCUMENTS

| | | | |
|---|---|---|---|
| 11,108,595 B2 | 8/2021 | Knutsen et al. | |
| 11,146,632 B2 | 10/2021 | Rubenstein | |
| 2004/0148430 A1* | 7/2004 | Narayanan | H04L 63/0272 709/238 |
| 2007/0058644 A1* | 3/2007 | Brahmbhatt | H04L 61/2564 370/401 |
| 2010/0154050 A1 | 6/2010 | Mukkara et al. | |
| 2012/0099601 A1 | 4/2012 | Haddad et al. | |
| 2014/0115319 A1* | 4/2014 | May | H04L 67/563 713/150 |
| 2014/0337613 A1* | 11/2014 | Martini | H04L 63/0281 713/151 |
| 2014/0355441 A1 | 12/2014 | Jain | |
| 2016/0165564 A1* | 6/2016 | Vaswani | G01D 21/00 370/254 |
| 2017/0063558 A1* | 3/2017 | Jin | H04L 63/061 |
| 2017/0078248 A1* | 3/2017 | Bian | H04L 63/20 |
| 2017/0230180 A1 | 8/2017 | Benedict et al. | |
| 2018/0063193 A1* | 3/2018 | Chandrashekhar | H04L 47/32 |

FOREIGN PATENT DOCUMENTS

| | | | |
|---|---|---|---|
| WO | 2010105107 A1 | 9/2010 | |
| WO | 2019246331 A1 | 12/2019 | |

* cited by examiner

Policy
700

{
"Name": "Acme employees"
"Users": ["User1", "User2", "user3"]
"Targets": "Email Server"
"Topology": "hub and spoke"
"Services": ["SMTP", "IMAP"]
"Context": "Internal"
"QoS": "normal"
"chain-service": "antivirus"
}

{
"Name": "Acme Finance"
"Users": ["Finance group"]
"Topology": "mesh"
"Services": ["SMB"]
"QoS": "high"
"Context": "confidential"
}

{
"Name": "Acme IT"
"Users": ["IT group"]
"Targets": ["Jira1","git1"]
"Topology": "hub and spoke"
"Services": ["SSH"]
"QoS": "high"
"Context": "confidential"
}

FIG 7

Context 800

```
"Standard": {
  "Devices": "Any"
  "location": "Any"
  "time-of-day": "Any"
}
```

```
"Sensitive": {
  "Devices": ["Windows", "MacOS"]
  "OS-version": ["MacOS 12+"]
  "unmanaged-devices": "Yes"
  "Location": "US"
  "time-of-day": 9:00-17:00 UTC"
  "auth-level": "2FA"
}
```

SYSTEM AND METHOD FOR CREATING A SECURE HYBRID OVERLAY NETWORK

FIELD OF THE INVENTION

The present invention relates to the field of network security and connectivity; more particularly, the present invention relates to establishing an overlay network on top of the public Internet that will securely and efficiently permit communication for any plurality of computing devices.

BACKGROUND OF THE INVENTION

The Internet was never built for today's modern enterprise requirements, and consequently the vast majority of cybersecurity and networking tools attempt to address the symptoms and not the core design flaws of the underlying network. With the increasingly decentralized enterprise, the perimeter has disappeared and a new paradigm is required to connect and protect disparate users and services, whereby the network is architected for security and performance from the ground up.

BRIEF SUMMARY OF THE INVENTION

The present invention overcomes the drawbacks of the background art by providing a system and method for supporting secure communication for a plurality of computational devices, for example as an overlay to an existing computer network. Without wishing to be limited in any way, such an overlay may be added to the internet for example.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the apparatuses, devices, methods, and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions.

Software (e.g., an application, computer instructions) which is configured to perform (or cause to be performed) certain functionality may also be referred to as a "module" for performing that functionality, and also may be referred to as a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one more modules; in some embodiments, a module may comprise computer instructions—which can be a set of instructions, an application, software—which are operable on a computational device (e.g., a processor) to cause the computational device to conduct and/or achieve one or more specific functionality. Thus, for some embodiments, and claims which correspond to such embodiments, the noted feature/functionality can be described/claimed in a number of ways (e.g., computational device, processor, module, software, application, computer instructions, and the like).

Some embodiments are described with regard to a "computer", a "computer network," and/or a "computer operational on a computer network," it is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP (Internet Protocol) telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 7 is a diagram of one embodiment of a policy object.

FIG. 8 is a diagram of one embodiment of a context object.

DETAILED DESCRIPTION OF AT LEAST SOME EMBODIMENTS

The present invention describes a system and method for creating a secure overlay network on top of the public Internet. Unlike the public Internet, the new overlay network is built from the ground up for simplicity, security and performance and therefore does not require the deployment of numerous networking and cybersecurity solutions. Without wishing to be limited by a closed list, this is accomplished through the overlay network's following unique design attributes: creating an identity-based network in which user identities are the identifiers rather than IP addresses, and whereas only authenticated and authorized users whose identity has been established have visibility and access to the network; establishing fully encrypted and private network segments; providing superior performance through improved protocols and routing; and implementing a decentralized topology that allows any two nodes on it to communicate regardless of each node's location or network settings—as if the two nodes are on the same local area network.

Figure 9:
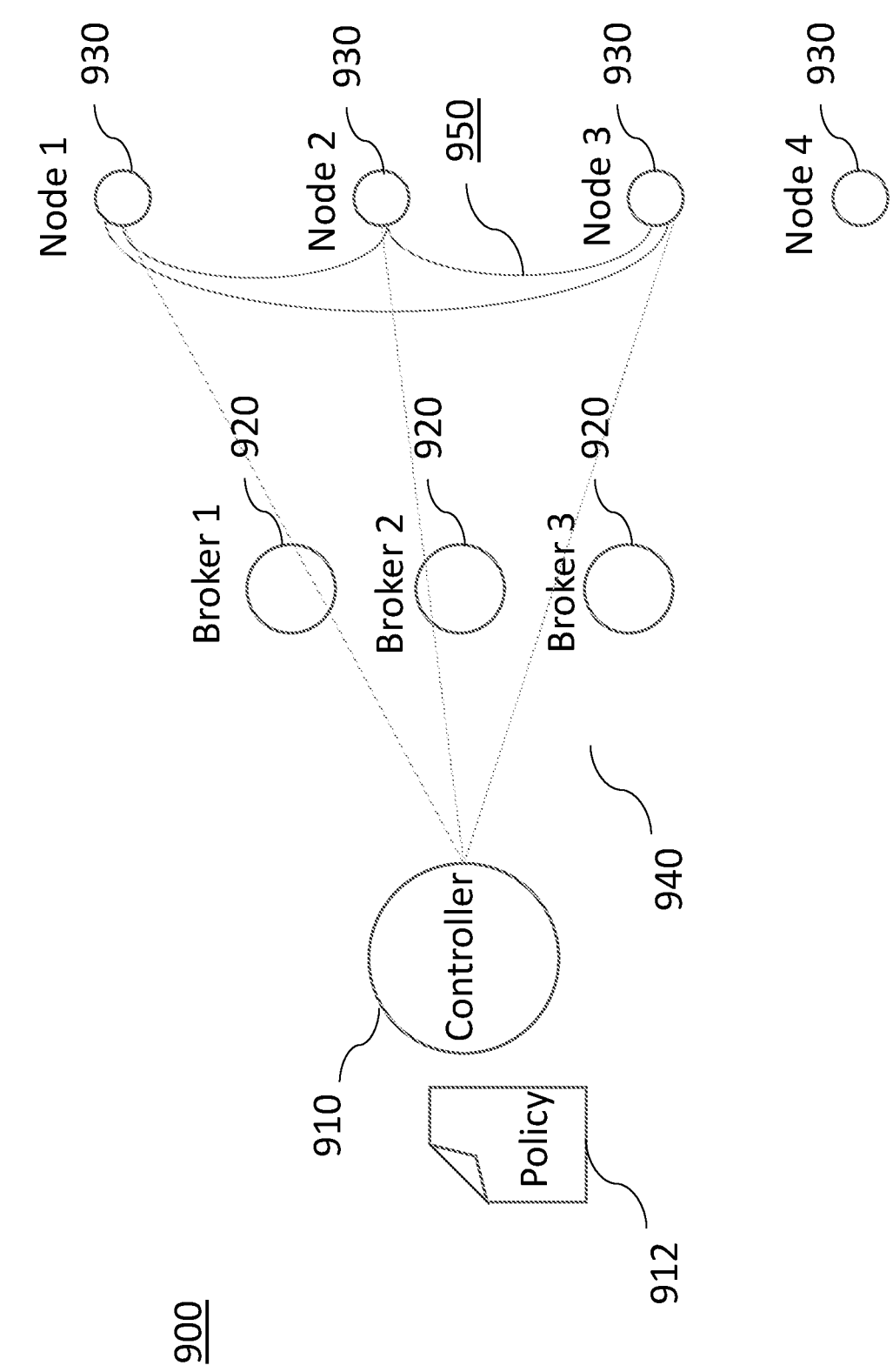
FIG. 9 is a network diagram of one embodiment of a secure overlay network acting as a control plane.

FIG. 1-7 are diagrams of some embodiments of the principal individual system components, followed by diagrams describing their principal settings in FIGS. 8-9, and by a description of the components' interactions in FIGS. 9-17.

Figure 1:
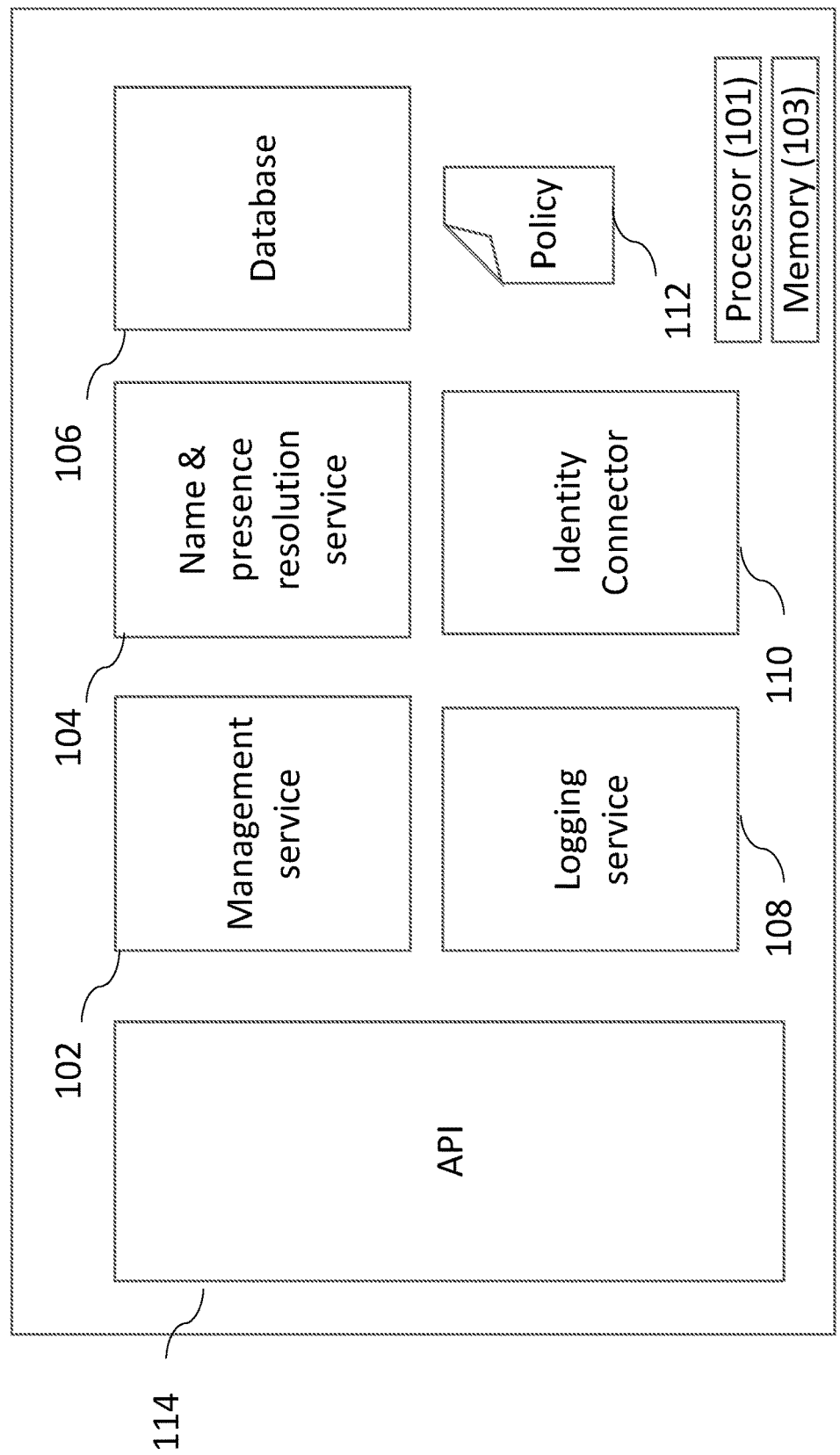
FIG. 1 is a diagram of one embodiment of the system's controller.

FIG. 1 is a diagram of one embodiment of the controller 100, responsible for management of one or more overlay networks along with all network components as described in FIGS. 2-7, user authentication and authorization, and mapping of the network's nodes and their unique identifiers on the overlay network into the IP addresses of the underlying. The controller may be further comprised of one or more physical servers, virtual machines, microservices or serverless instances. In a non-limiting example as shown, controller 100 features a processor 101 and a memory 103, which may be a plurality of such processors and memories (not shown). As used herein, a processor such as processor 101 generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory, such as memory 103 in this non-limiting example. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

For example, memory 103 may store information related to the presence of all other system components as described hereinbelow, and instructions and policy 112 information related to responding to network requests based on said policy.

In this non-limiting example, processor 101 is configured to perform a defined set of basic operations in response to receiving a corresponding basic response to receiving a corresponding basic instruction selected from a defined native instruction set of codes. The native instruction set of codes may be determined for example according to the operating system of controller 100. This set of machine codes selected from the native instruction set may relate to processing of inbound network requests from all system components, determining responses to such incoming requests, and sending responses to system components in accordance with the policy.

Figure 18:
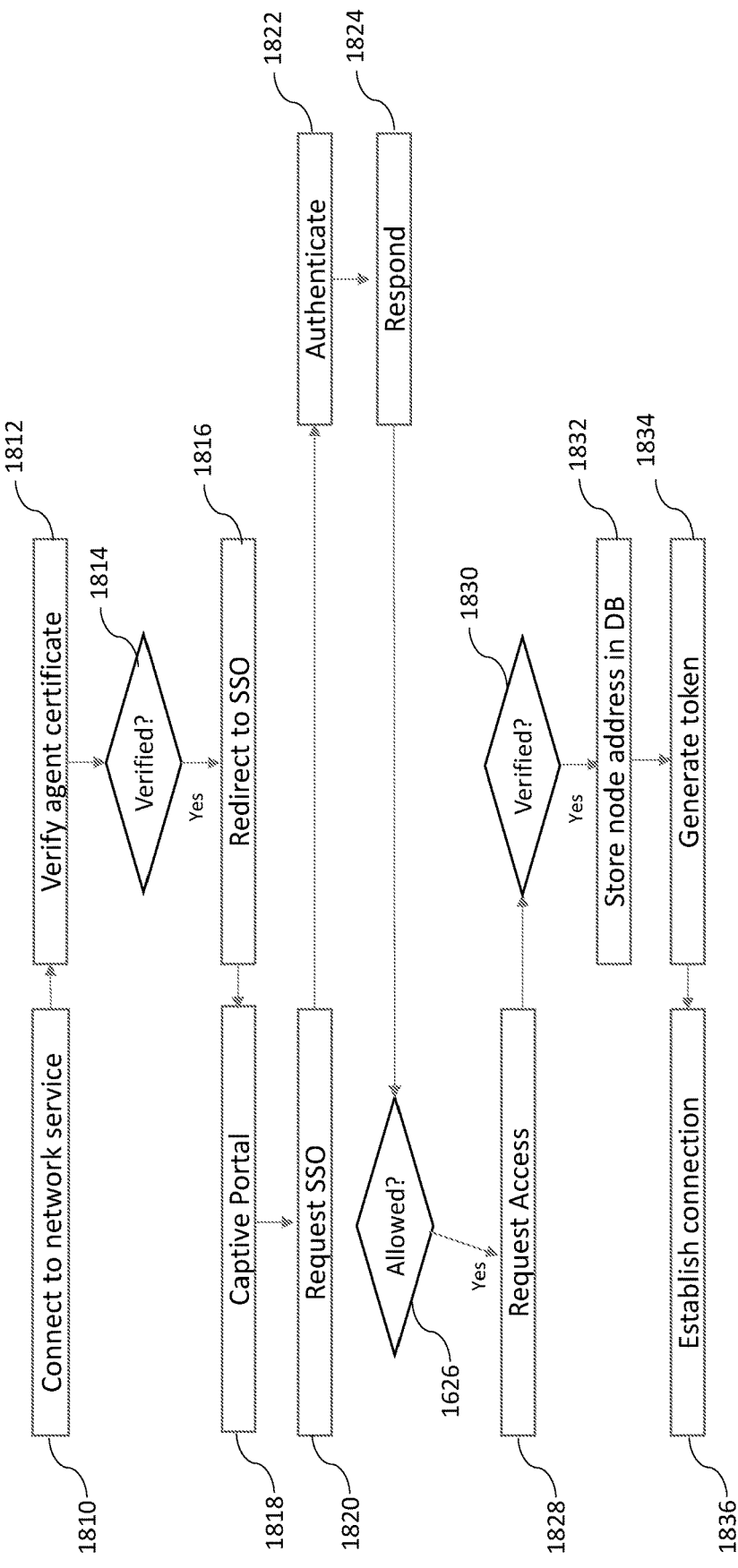
FIG. 18 is a block diagram of one embodiment of the initial workflow required for connecting to the overlay network.

Components of controller 100 include a distributed management service 102 responsible for communicating and controlling all the system's components, a name and presence resolution service 104 that maintains a mapping between the Internet's underlying IP addresses to the overlay network's nodes, their presence status (connected, disconnected) and their unique identifiers as will be elaborated in FIG. 18, a database service 106 storing all settings data associated with all system components, a logging service 108 responsible for collecting logs from all distributed system components, a user identity connector service 110 connected to third party identity providers responsible for authenticating and authorizing users and devices onto the network, and a set of APIs 114. A policy object 112 is associated with the controller and resides in database service 106. The policy, as can be implemented as described in FIG. 7 hereinbelow as a non-limiting example, determines settings such as network topology, network access permissions, and contextual access rules.

In some embodiments, the controller's name and presence resolution service 104 is distributed or decentralized and comprises two or more physical servers, virtual machines, microservices or serverless instances. The name and presence resolution service may be comprised of an industry standard distributed database, such as MongoDB, or a managed cloud database, such as Google Spanner. Alternatively, it may leverage industry standard DNS hierarchical architecture to maintain a distributed service. In some embodiments, the name and presence resolution service may utilize a Blockchain repository such as Ethereum.

In some embodiments, the database service 106 is distributed or decentralized and comprises two or more physical servers, virtual machines, microservices or serverless instances. The database service may be comprised of an industry standard distributed database, such as MongoDB, or a managed cloud database, such as Google Spanner.

In some embodiments, components 102, 108, 110, and 114 are also distributed, each comprising two or more physical servers, virtual machines, microservices or serverless instances.

Figure 2:
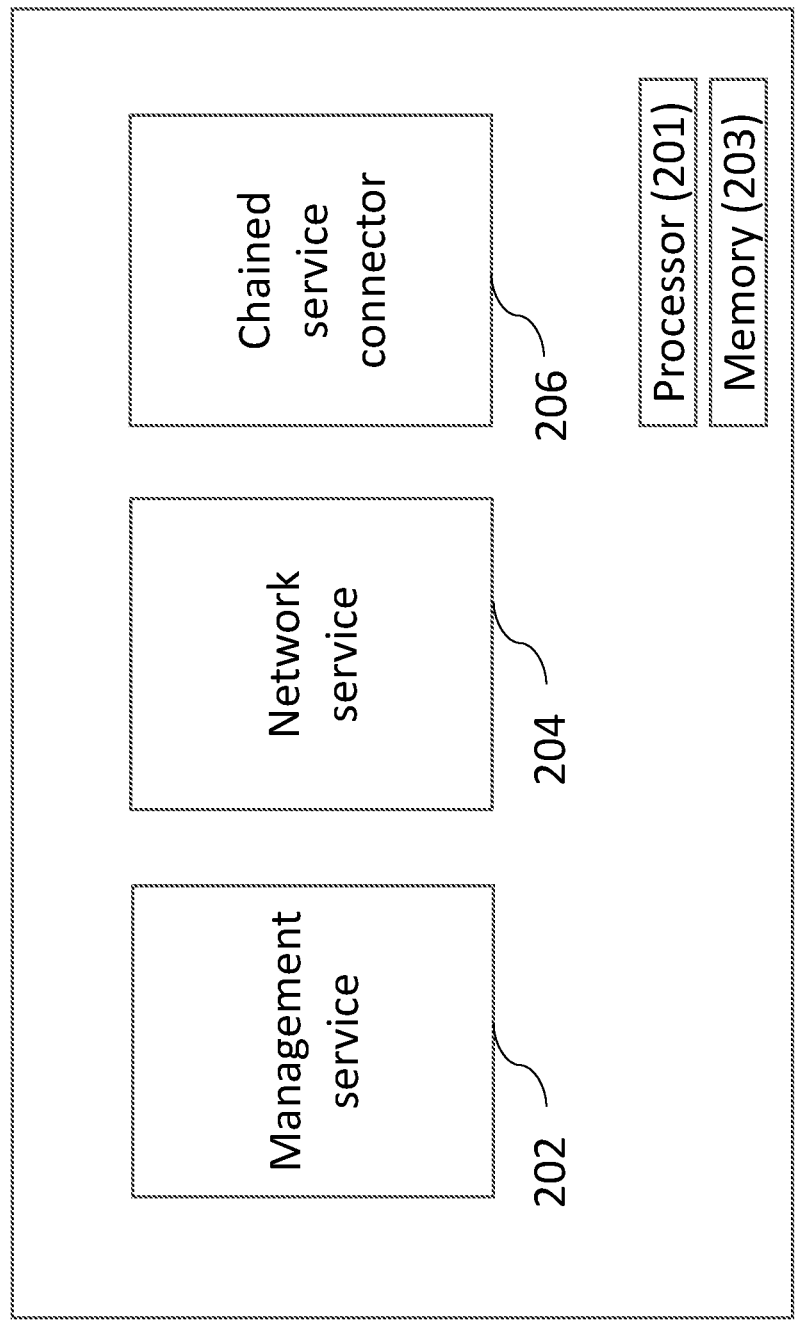
FIG. 2 is a diagram of one embodiment of the system's broker.

FIG. 2 is a diagram of one embodiment of broker 200, responsible for relaying network traffic originating from nodes described in FIGS. 3-7 when applicable to overcome connectivity issues, accelerate network performance, or provide additional security and networking services as will be elaborated later. The communication broker may be further comprised of one or more physical servers, virtual machines, microservices or serverless instances. Optionally broker 200 comprises a processor 201 and a memory 203, which may operate as previously described.

For example, memory 203 may store information related to configuration of the allowed connection between any two network nodes as described hereinbelow.

In this non-limiting example, processor 201 is configured to perform a defined set of basic operations in response to receiving a corresponding basic response to receiving a corresponding basic instruction selected from a defined native instruction set of codes. The native instruction set of codes may be determined for example according to the operating system of broker 200. This set of machine codes selected from the native instruction set may relate to processing of network traffic from network nodes, and forwarding said traffic to other network nodes in accordance with the configuration hereinabove.

The broker software comprises a management service 202 that communicates with the controller described hereinabove, a network service 204 that implements a reverse network proxy that relays traffic originating from nodes described in FIGS. 3-7 herein, and a chained service connector 206, allowing chaining additional proxies and relaying traffic through them.

The following FIGS. 3-6 describe the overlay network's end nodes. The overlay network's main function is to facilitates connection of such nodes together securely and efficiently in accordance with the policy and settings managed by the controller shown in FIG. 1 hereinabove.

Figure 3:
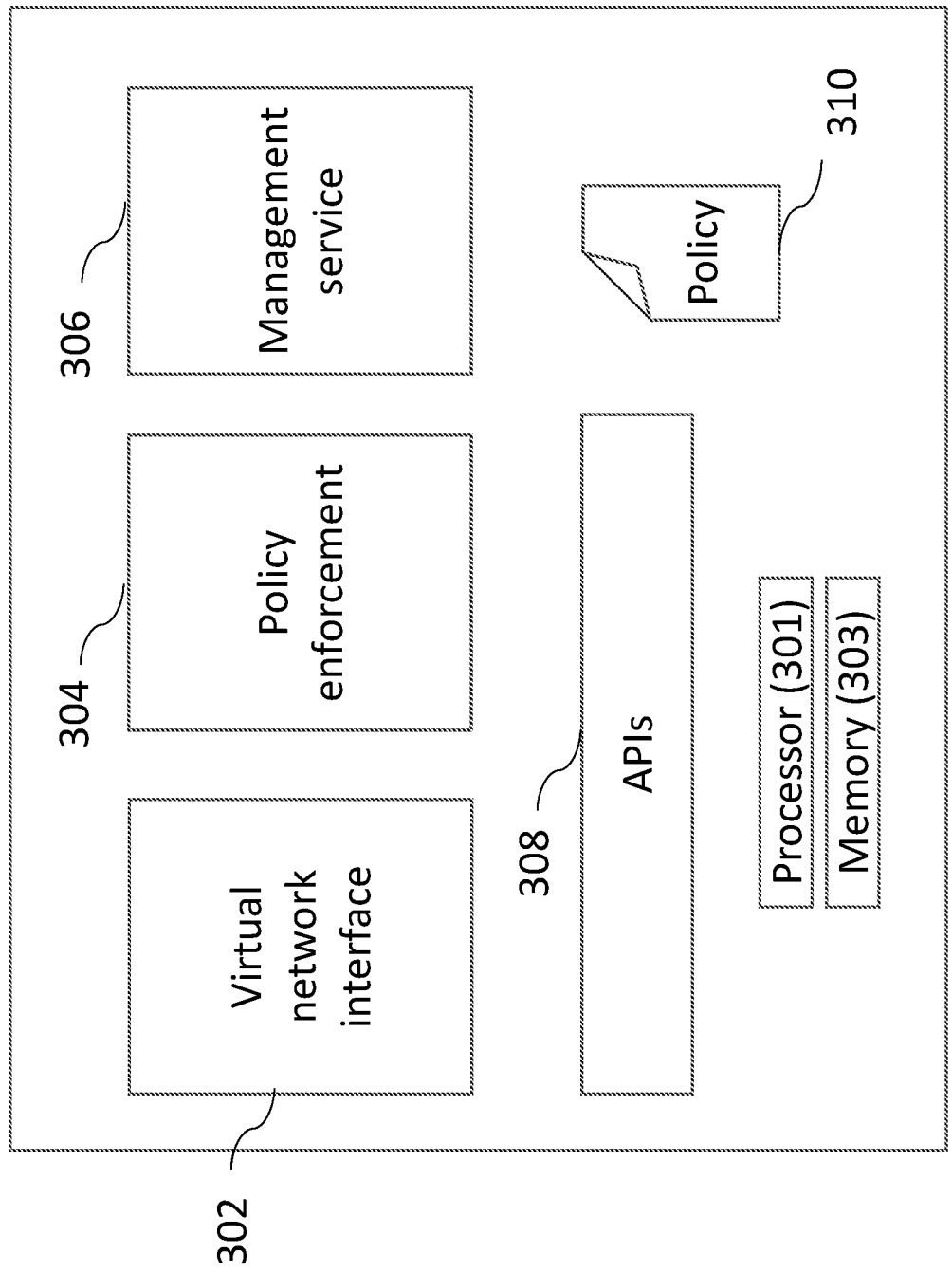
FIG. 3 is a diagram of one embodiment of a standard edge node.

FIG. 3 is a diagram of one embodiment of the network's edge node 300. An edge node may comprise an end user's computer, a mobile device or any suitable computational device as described herein. The edge node further comprises a virtual network interface 302, which in one embodiment is a TAP device capturing some or all of the network traffic going to and from the edge node, a policy enforcement module 304 which enforces rules over traffic traversing the virtual network interface in accordance with policy object 310 derived from the central policy object held by the controller as described hereinabove, a management service 306 responsible for communications with same controller, and a set of APIs.

Optionally edge node 300 comprises a processor 301 and a memory 303, which may operate as previously described. For example, memory 303 may store instructions related to operation of policy enforcement module 304, which are then executed by processor 301. Policy object 310 may be received from controller 100, for example as a set of rules that policy enforcement module 304 then applies to communications sent from and received by edge node 300. Receiving policy object 310 from controller 100 gives centralized control within the system for policy determination and enforcement.

In this non-limiting example, processor 301 is configured to perform a defined set of basic operations in response to receiving a corresponding basic instruction selected from a defined native instruction set of codes. The native instruction set of codes may be determined for example according to the operating system of edge node 300. Memory 303 preferably stores several sets of machine codes, including a first set of machine codes selected from the native instruction set for executing policy enforcement, for example as embodied by policy enforcement module 304. A second set of machine codes selected from the native instruction set may relate to analysis of incoming network traffic, to determine whether such incoming traffic is in accordance with the policy. A third set of machine codes selected from the native instruction set may relate to analysis of outgoing data, instructions and so forth from edge node 300, to determine whether such outgoing data, instructions and so forth are in accordance with the policy.

Figure 4:
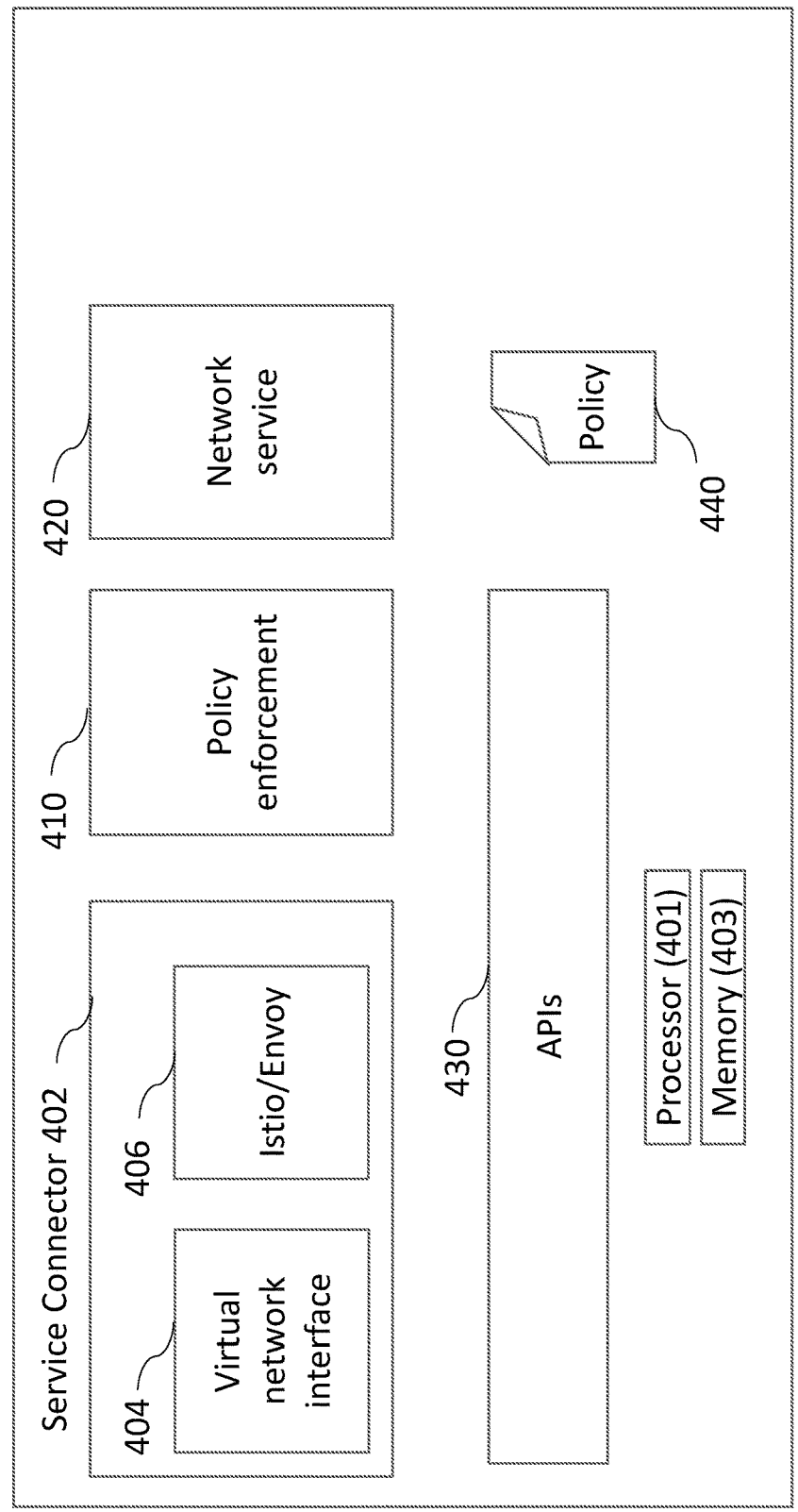
FIG. 4 is a diagram of one embodiment of a headless edge node.

FIG. 4 is a diagram of one embodiment of the network's headless edge node 400. The headless node may be a physical or virtual server machine, microservice or serverless instance. A headless node does not require interactive user authentication as will be described herein and may be used for example for connecting server-side computing devices such as listed hereinabove. The headless node further comprises a service connector 402 connecting it to a server or service instance, which may comprise a virtual network interface 404, or an Istio or Envoy based proxy 406. The headless node further comprises a policy enforcement module 410 which applies rules over traffic traversing the network interface in accordance with policy object 440 derived from the central policy object held by the controller as described hereinabove, a network service 420 allowing it to be managed by the controller, and a set of APIs 433.

Optionally headless edge node 400 comprises a processor 401 and a memory 403, which may operate as previously described.

Figure 5:
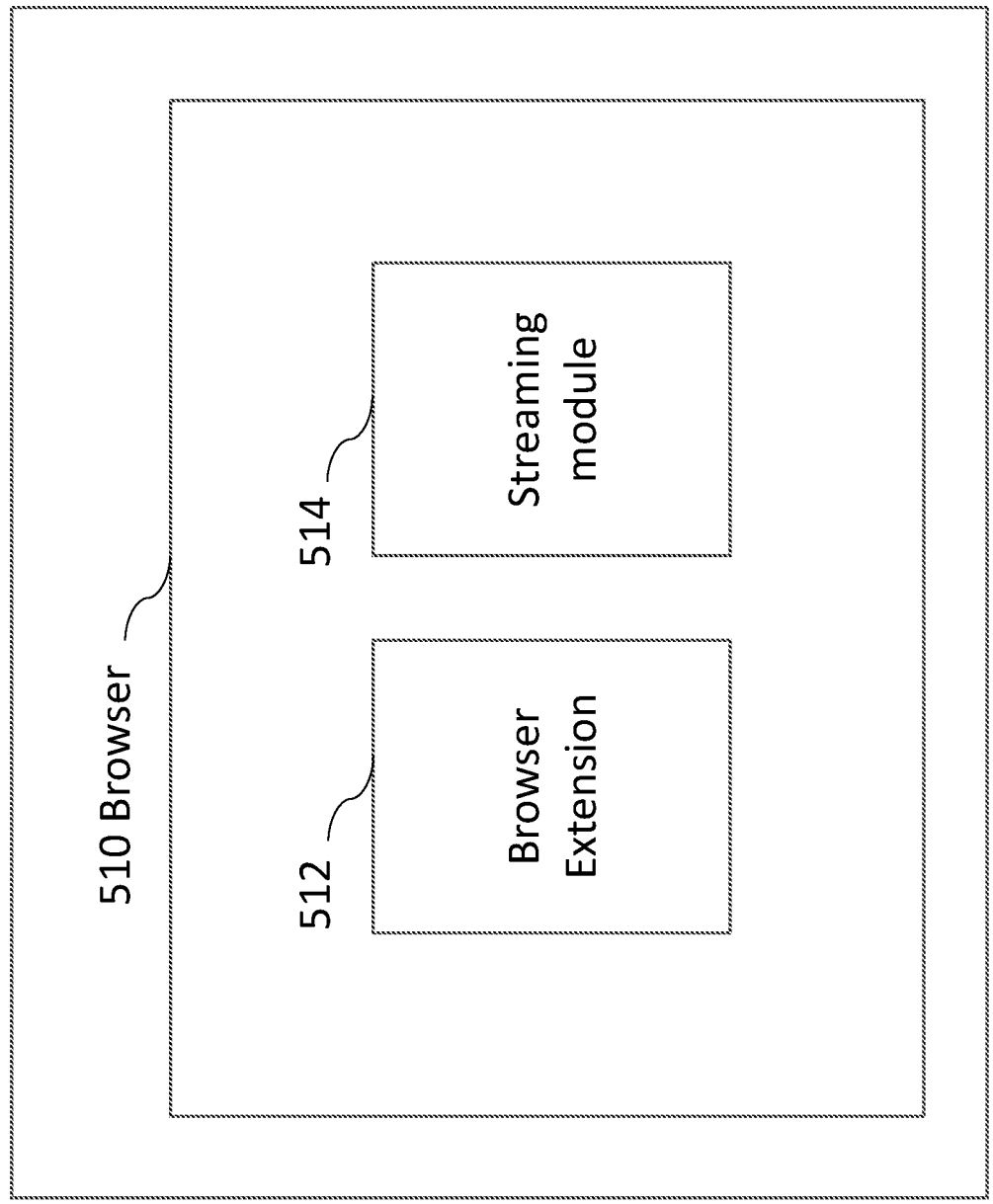
FIG. 5 is a diagram of one embodiment of clientless edge node.

FIG. 5 is a diagram of one embodiment of the network's clientless node 500. The clientless node may be any end user computing device or any other suitable computational device. The edge node further comprises a browser 510. The browser comprises a browser extension 512 (such as a Chrome extension or Web Assembly Plugin) that communicates with the controller and a second node, or a streaming module 514 capturing and displaying a second node interface using protocols such as ICA, HDX, or similar protocols.

Preferably, clientless node 500 comprises a processor 501 and a memory 503, which may operate as previously described. For example, processor 501 and memory 503 may respectively store and process instructions related to execution of the browser and the browser extension 512 and/or the streaming module 514, which result in a network connection being made to a second node in accordance with the policy or set of rules received from the controller, and the transfer of data from the second node to the client node 500.

Figure 6:
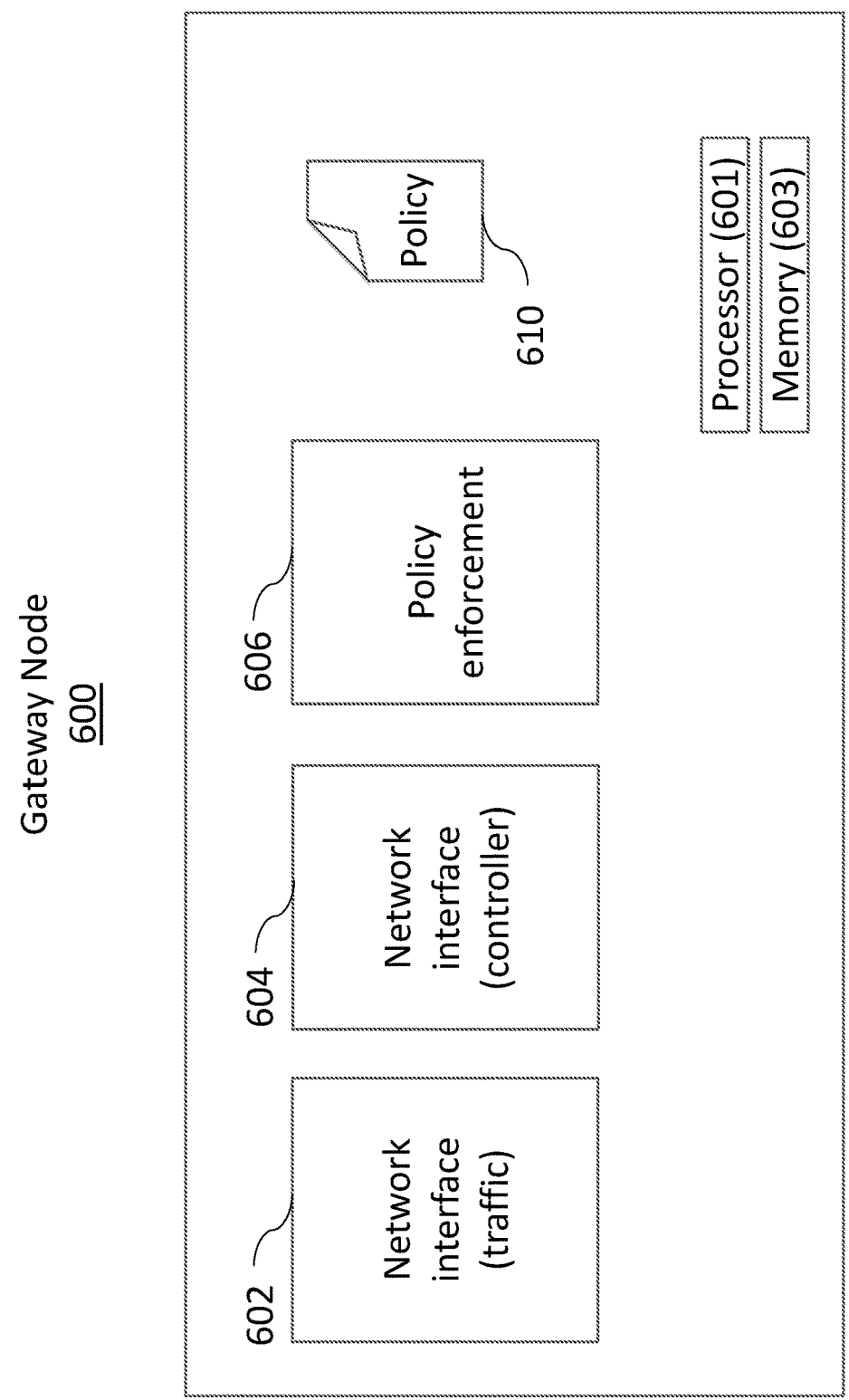
FIG. 6 is a diagram of one embodiment of a gateway edge node.

FIG. 6 is a diagram of one embodiment of the network's gateway edge node 600. A gateway edge node may be a physical or virtual gateway device, coupled to a computing device, a computer network, one or more IoT (Internet of Things) devices, or a cloud instance such as a VPC (Virtual Private Cloud). In one embodiment, the computing devices or computer network may be coupled to the gateway via a local area network. In one embodiment, the computing devices or computer network may be coupled with the gateway node via a wireless connection, such as a cellular telephone connection, wireless fidelity connection, etc.

The gateway node 600 further comprises a network interface 602 capturing inbound and outbound traffic from the network connected on one side of the gateway, a network interface 604 for communicating with the controller, and a policy enforcement module 606 which enforces rules over traffic traversing the network interface in accordance with policy object 610 derived from the central policy object held by the controller as described hereinabove.

Gateway node 600 also preferably comprises a processor 601 and a memory 603, which may operate as previously described. For example, the instructions for the execution of policy enforcement module 606 may be stored in memory 603 and executed by processor 601, for example as previously described.

FIG. 7 is a diagram of one embodiment of the overlay network's policy 700. The policy is maintained by the controller and includes a list the relationships between user identities, devices and services, along with restrictions, and actions.

A non-limiting exemplary system as embodied herein may comprise one or more overlay networks. The operation of network traffic may be controlled according to a policy 702, which may be the same or different for each such overlay network.

Policy 702 preferably comprises the network's settings, including the network topology which determines if a connection is allowed between any two nodes and in what direction. Policy 702 may also determine the identity of the permitted network participants comprising of a list of users, groups and other device identifiers. Within the context of permitted participants, further restrictions may be added, including but not limited to network access permissions, allowed and disallowed network services, desired quality of service, desired node posture (such as may be obtained from an endpoint security agent), any additional services that may be chained to the network, including antivirus, data loss prevention and other services, and contextual access rules as may be implemented in accordance with FIG. 8 hereinbelow as a non-limiting example. For example, the policy may dictate a number of edge nodes associated with a group of users can connect to a headless server node and restricted to an FTP service, thereby facilitating an FTP site only accessible to said nodes, FIG. 8 is a diagram of one embodiment of a context object 800 that may be associated with one or more policies. Context object 800 preferably determines contextual network access rules, including what types of devices may access the network, such as Window OS, MacOS, iOS, Linux, Android, or other operating systems, whether unmanaged devices (devices that are not corporate managed) are allowed onto the network, what minimal operating system versions are allowed, in what hours of the day is a connection allowed, what geo-locations are users allowed to connect from, what device posture is required (for example, the connecting device may need to have an up-to-date antivirus) and what authentication level is required (simple, two-factor, re-authentication).

The following FIGS. 9-17 describe the interactions between the components in FIGS. 1-6 hereinafter referenced as a block, as determined according to settings shown in FIGS. 7-8.

The following FIGS. 9-16 comprise several key overlay network configurations and corresponding flow chart diagrams, FIG. 9 is a network diagram of one embodiment of a secure overlay network. In one embodiment, the overlay network 900 allows direct connection among nodes that represent multiple disparate computing devices, such as laptops, desktops, servers, smartphones, tablets, IoT devices, etc.

In one embodiment, the overlay network 900 includes a controller 910 and a policy associated with it 912, one or more brokers 920, as well as one or more computing devices 930 implementing nodes associated with one or more users. In one embodiment, the controller 910 and brokers 920 are server computer systems, while the nodes 930 are server computer systems, desktops or laptop computers, mobile devices such as smartphones and tablets, web browsers, or IoT devices.

The controller 910 and computing devices 930 may be coupled to a logical network 940 that communicates using any of the standard protocols for the secure exchange of information. In one embodiment, one or more computing devices may be coupled with the network via a wireless connection, such as a cellular telephone connection, wireless fidelity connection, etc. The computing devices and controller may run on one Local Area Network (LAN) and may be incorporated into the same physical or logical system, or different physical or logical systems. Alternatively, the computing devices and controller may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In some embodiments, some or all of the nodes 930 may be connected over a network tunnel 950 as per policy 912. Such a tunnel may use standard VPN (Virtual Private Network) protocols such as IPSEC (IP Security) or PPTP (Point-to-Point Tunneling Protocol), SSL/TLS (Secure Sockets Layer/Transport Layer Security), or proprietary TCP (Transmission Control Protocol), UDP (User Datagram Protocol), or IP-based protocols. For such a non-limiting embodiment, any two nodes not connected via the tunnel 950 are not considered to be on the same overlay network and are not mutually visible.

In some embodiments, all communications of computing devices 930 are encrypted, with the original payload encrypted using industry-standard encryption, such as AES-256. In some embodiments, encryption keys for each pair of computing devices 930 are determined by controller 910 and communicated to the individual nodes. In some embodiments, any two nodes use standard key exchange methods, such as public key encryption or Diffie Hellman. Alternatively, the system uses Identity-Based Encryption (IBE) to determine the key Kij for each nodes i and j, while the controller acts as the Private Key Generator (PKG).

In some embodiments, the underlying protocol for the tunnel is an IP or UDP-based protocol that provides reduced latency compared to TCP, advanced congestion control such as TCP BBR, allows multiplexed streams, and forward error correction such as Google's QUIC.

In some embodiments, policy 912 is downloaded from the controller and cached on the node for a configurable period of time determined by the controller. The policy downloaded by the node includes a subset of the controller policy as may be implemented in accordance with in FIG. 1 hereinabove as a non-limiting example that applies to each node 930. In some embodiments, the policy dictates which nodes 930 may be connected and in what direction, and what restrictions apply to such connections as may be implemented in accordance with FIG. 7 hereinabove as a non-limiting example. For example, the policy may determine that nodes 930 may only communicate through tunnels 950. Furthermore, the policy may determine that only nodes 930 connected through tunnels 950 are mutually visible. However, in this current example the policy does not permit brokers 920 to relay network traffic originating from nodes 930.

In some embodiments, the tunnels 950 are transient and are only established when a first node initiates authorized communication with a second node, and optionally time out and disconnect after a user configurable time interval.

The controller 910 may be implemented in accordance with FIG. 1 hereinabove as a non-limiting example.

The broker 920 may be implemented in accordance with FIG. 2 hereinabove as a non-limiting example.

The nodes 930 may be implemented in accordance with FIG. 3-6 hereinabove as a non-limiting example.

The policy 912 may be implemented in accordance with FIG. 7 hereinabove as a non-limiting example.

Figure 10:
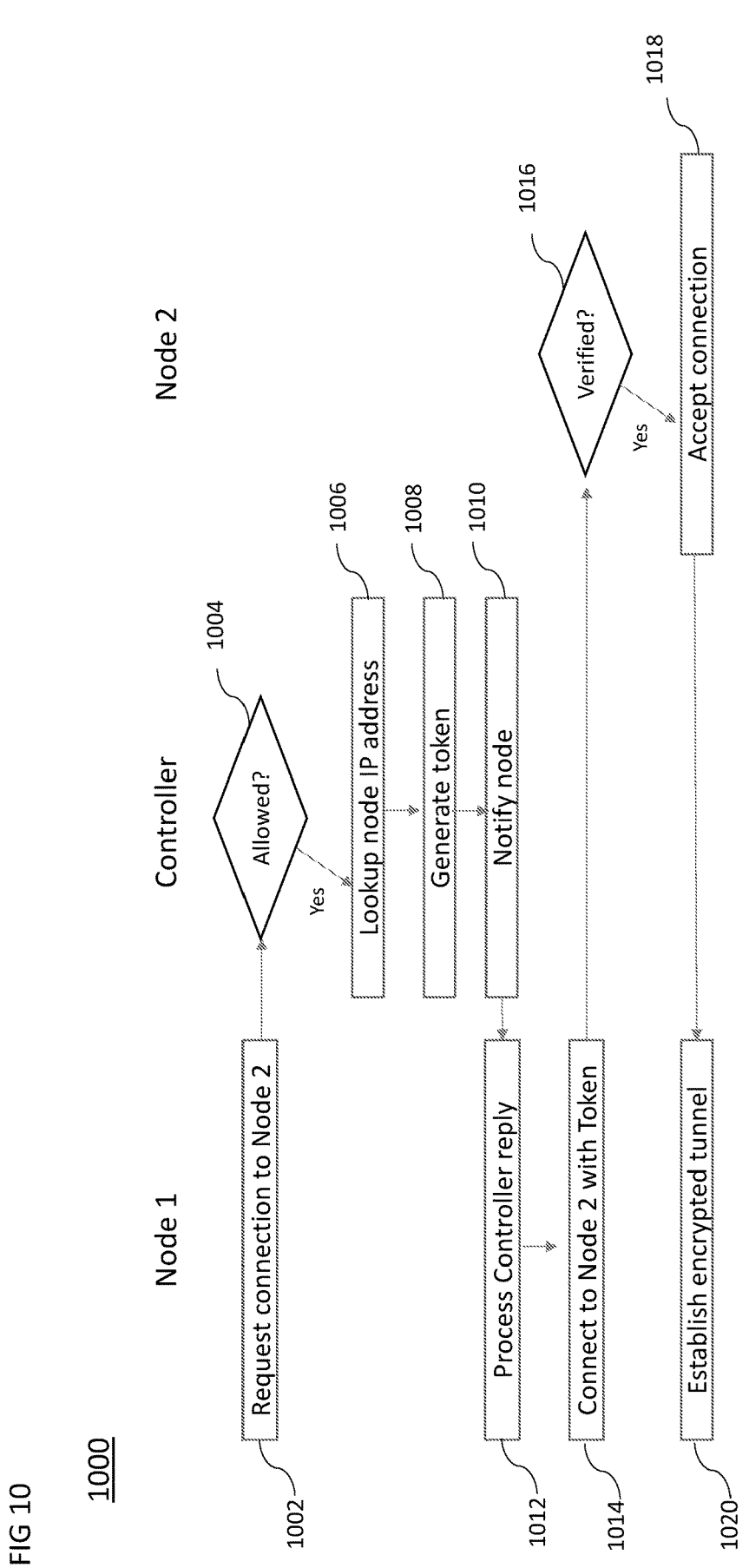
FIG. 10 is a flow diagram of how the overlay network components interact when it is acting as a control plane.

FIG. 10 is a flow chart showing the interaction between the different components of the overlay network referenced in FIG. 9 hereinabove.

In one embodiment, an initial connection between a first node wishing to connect to a second node over the overlay network comprises of the following steps: a first node sends a request to the controller to connect to a second node 1002. The controller may utilize its management service module to receive such connection request from the first node as shown in FIG. 1 hereinabove, as a non-limiting example; The controller checks the identifiers of the first and second nodes (e.g. "user1@acme.com", "user2@acme.com", or other suitable identifiers of the nodes) against the policy and connection is only allowed if and only if the policy allows it in 1004. If a connection is not allowed the controller rejects the request and no connection is established.

If the connection is approved, the controller resolves the IP address associated with the second node based on its identifier sent by the first node 1006, such lookup may be performed by the controller's name and presence resolution service as implemented in accordance with FIG. 1 as a non-limiting example; the controller generates a cryptographically signed token for the connection 1008; the controller transmits the IP address and token to the first node 1010; the first node processes the response from controller 1012; the first node initiates a connection to the second node and passes the token 1014; the second node validates the token 1016; if valid, the connection is accepted 1018; the first node then establishes a secure tunnel to the second node 1020.

In some embodiments, an initial deployment of client-side certificates or keys is performed by the controller. These certificates or keys are used according to industry standards in establishing the tunnels using TLS, Diffie-Hellman or other key exchange algorithms at the establishment of the connection between the network nodes to ensure the authenticity of both parties.

In some embodiments, each node may send logging information back to the controller. Log information may be configurable by policy and include connection times, destinations, status, and performance data. The logging information may be formatted as Syslog, Common Event Format (CEF) or other textual or binary formats. For capturing logs the controller may implement its logger service as shown in FIG. 1 as a non-limiting example. The logger service processes communication in the formats hereinabove and stores some or all of the data into a database. In some embodiments, the controller logger service may apply industry standard anomaly detection methods, including statistical methods (such as detection of deviation from the mean, low pass filters) and machine learning based approaches (such as clustering approaches, SVM and neural networks). For example, the controller may identify a node acting in an anomalous way such as scanning multiple other nodes and ports, or connecting to low-reputation Internet addresses.

Figure 11:
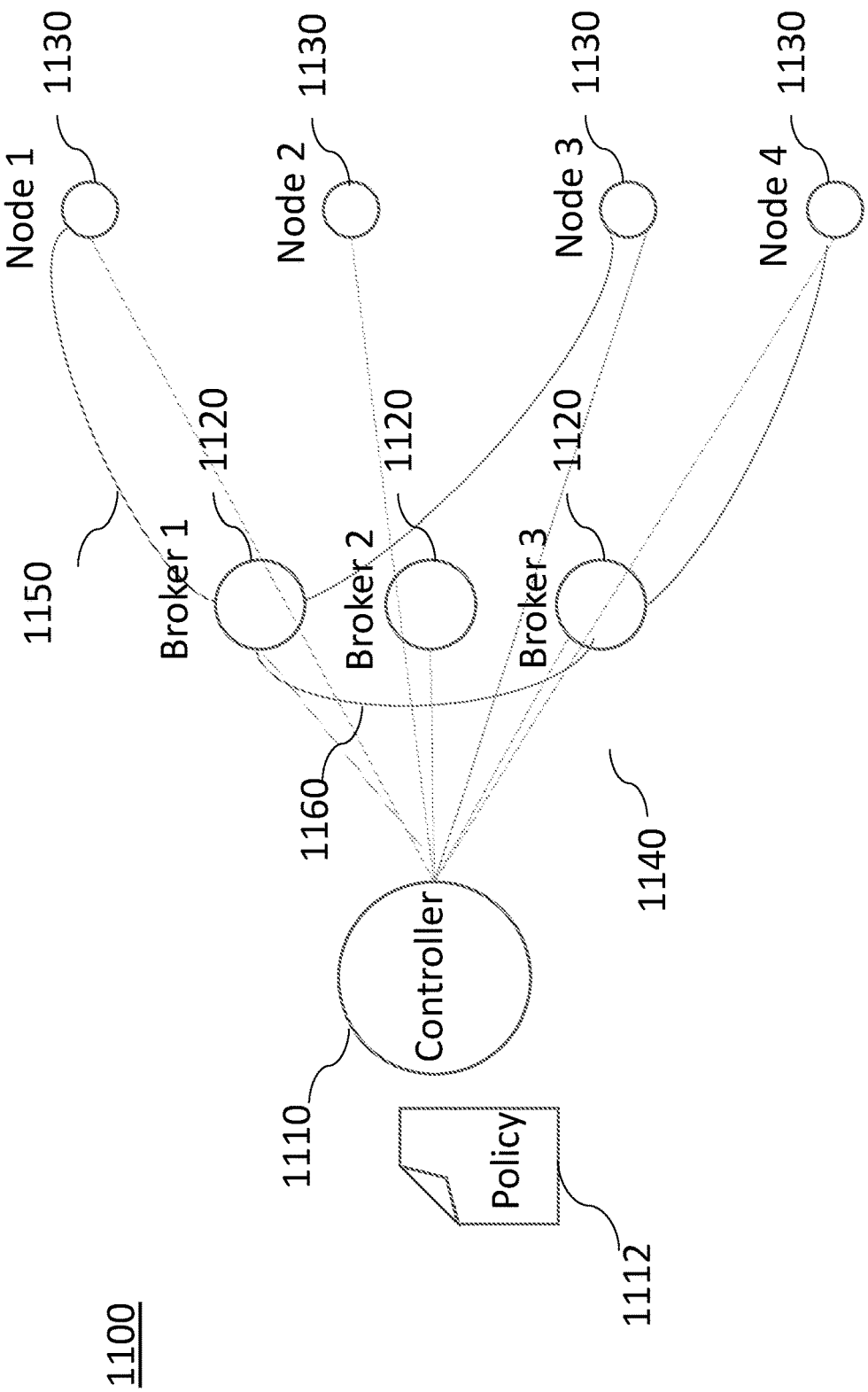
FIG. 11 is a network diagram of one embodiment of a secure overlay network acting as both a control and data plane.

FIG. 11 is a network diagram of one embodiment of a secure overlay network. In one embodiment, the overlay network 1100 connects nodes indirectly via one or more proxies ("brokers") residing in a public or private cloud.

In one embodiment, the overlay network 1100 includes a controller 1110, and a policy associated with it 1112, one or more brokers 1120, as well as one or more computing devices implementing network nodes. In one embodiment, the controller 1110 and proxies 1120 are server computer systems, while the nodes 1130 are server computer systems, desktops or laptop computers, mobile devices such as smartphones and tablets, web browsers, or IoT devices. In some embodiments, controller 1110 consists of a distributed set of two or more servers.

The controller 1110, brokers 1120, and computing devices 1130 may be coupled to a network 1140 that communicates using any of the standard protocols for the secure exchange of information. In one embodiment, one or more computing devices may be coupled with the network via a wireless connection, such as a cellular telephone connection, wireless fidelity connection, etc. The computing devices and controller may run on one Local Area Network (LAN) and may be incorporated into the same physical or logical system, or different physical or logical systems. Alternatively, the computing devices and controller may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In some embodiments, the computing devices 1130 communicate with the controller 1110 over a network connection 1140 to determine the topology of the overlay network. As per policy 1112, some or all of the nodes 1130 may be connected over a network tunnel 1150 that connects two or more computing devices 1130 through a broker 1120, whereas all communication goes to the broker in order to traverse the network between the computing devices. Such a tunnel may use standard VPN protocols such as IPSEC or PPTP, SSL/TLS, or proprietary TCP, UDP, or IP-based protocols. Any two nodes not connected via the tunnel 1150 are not considered to be on the same overlay network and are not mutually visible.

In some embodiments, the connectivity establishment direction is always outbound originating from the nodes 1130. Regardless of the client request direction, the tunnel is established between the brokers 1120 and the nodes 1130 always in the outbound direction to the brokers 1120. All tunneled traffic can then go in the desired direction within the established tunnel. By doing so, it is unnecessary to punch holes in any firewall to allow inbound traffic. Moreover, computing devices IP addresses do not necessarily need to be routable, as it is enough only for the brokers on the network to have access to such IP addresses. In some embodiments, in order to set up such a tunnel, upon a first connection attempt by a node 1130 said node sends a connection request to the controller 1100 comprising of the sender and recipient identities, sender context and desired service, the controller responds by sending out a command to the first and second nodes to initiate said tunnel, such a command comprising of the brokers 1120 identifiers and direction parameters, the first and second node then initiating outbound connections to brokers 1120 per controller instructions.

In some embodiments, all communications of computing devices 1130 are encrypted, with the original payload encrypted using industry-standard encryption, such as AES-256. In some embodiments, encryption keys for each pair of computing devices 1130 are determined by controller 1110 and communicated to the individual nodes. In some embodiments, any two nodes use standard key exchange methods, such as public key encryption or Diffie Hellman. Alternatively, the system uses Identity-Based Encryption (IBE) to determine the key Kij for each nodes i and j, while the controller acts as the Private Key Generator (PKG).

In some embodiments, the underlying protocol for the tunnel is an IP or UDP-based protocol that provides reduced latency, overhead and allows multiplexed streams, such as Google's QUIC.

The controller 1110 may be implemented in accordance with FIG. 1 hereinabove as a non-limiting example.

The broker 1120 may be implemented in accordance with FIG. 2 hereinabove as a non-limiting example.

The nodes 1130 may be implemented in accordance with FIG. 3-6 hereinabove as a non-limiting example.

Figure 12:
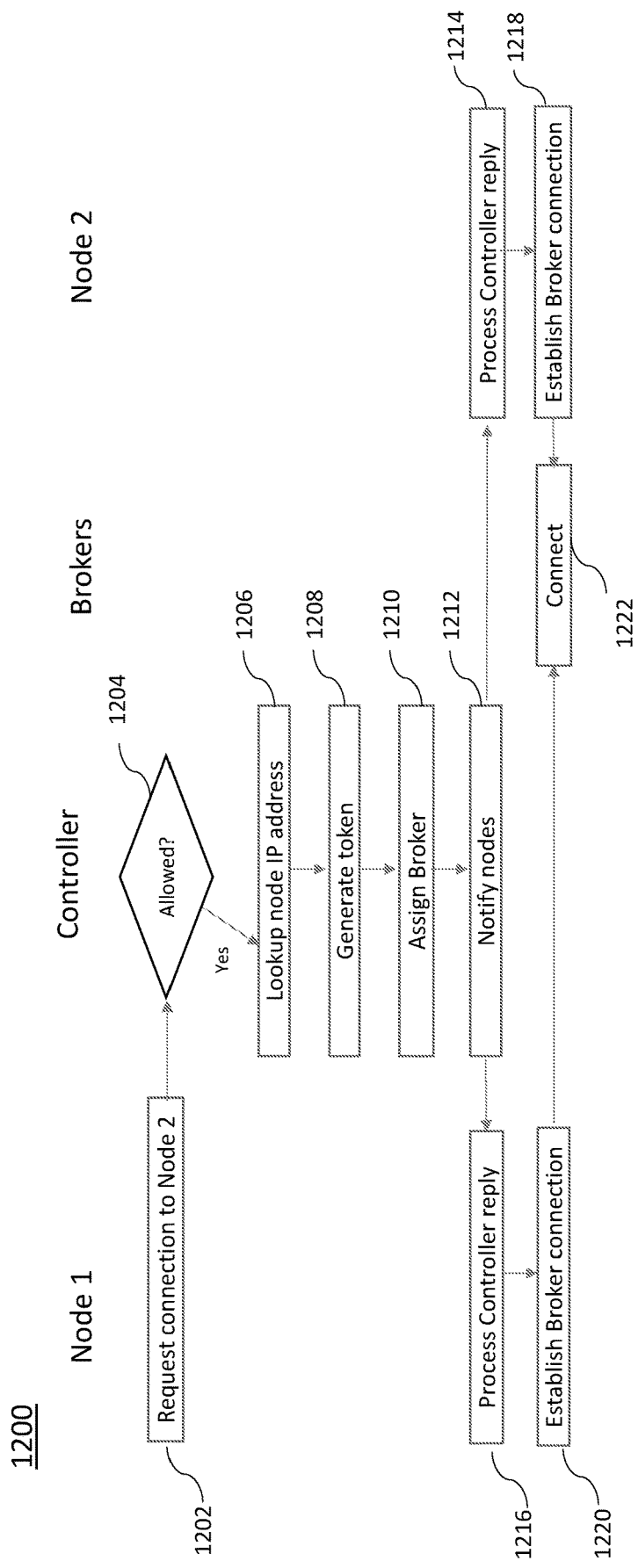
FIG. 12 is a flow diagram of how the overlay network components interact when it is acting as both a control and data plane.

FIG. 12 is a flow chart of showing the interaction between the different components of the overlay network referenced in FIG. 11 hereinabove.

In one embodiment, an initial connection between two nodes comprises of the following steps: a first node wishing to connect to a second node over the overlay network sends a request to the controller to connect to the second node 1202. For example, the controller may utilize its management service module to receive such connection request from the first node as shown in FIG. 1 hereinabove; The controller checks the identifiers of the first and second nodes against the policy and connection is only allowed if and only if the policy allows it 1204; if a connection is not allowed the controller rejects the request and no connection is established; if approved the controller then looks up the IP address associated with the second node based on the identifier sent by the first node 1206; the controller generates a cryptographically signed token for the connection 1208; the controller assigns a broker through which traffic between the first and second note will be forwarded 1210, such assignment comprising of choosing a broker from a plurality of brokers or requesting an additional broker to be initiated as elaborated hereinbelow; the controller transmits the IP address, token and broker identity to the first node 1016 and the second node 1214; the first node establishes a secure tunnel going to the broker 1220 and the second node establishes a secure tunnel going to the broker 1022; Alternatively, the first node establishes a tunnel to the broker 1020 and the broker establishes a second tunnel to the second node. The broker may utilize its network service module as shown in FIG. 2 hereinabove to connect the two nodes as a non-limiting example.

In some embodiments, there are a plurality of brokers, residing in multiple POPs or on multiple public cloud providers, such as AWS, GCP, Azure and others. The location of broker 1210 to through which the first and second node connect is determined by the controller based on the speed according to which the computing devices are able to communicate, as elaborated below.

In some embodiments, such determination is made by the controller maintaining a list of all broker IP addresses and assigning the closest broker based on the respective geo-ip distance of the first node and the broker. For example, for connecting a node in the UK to a node in California, a broker residing in AWS in the UK may be selected.

In some embodiments, such determination is made by directing communication to the closest broker using the standard AnyCast protocol.

In some embodiments, if no broker is available sufficiently close as determined by the policy or all close brokers are at their preconfigured capacity, the controller spins up additional broker instances in the desired location, utilizing standard techniques for spinning additional instances in public cloud services or VM and microservices platforms.

In some embodiments, such determination is made by the controller applying a predictive model based on network connection data collected periodically, including but not limited to throughput and latency data from all brokers and nodes. Prediction may use industry standard methods, such as hashing, clustering, or neural networks determine the best broker for each node based on the gathered data and such attributes as the node's geographic location, Internet service provider, type of device, and type of service and protocol.

In some embodiments, the controller will determine two brokers to be used, an ingress and egress brokers, by maintaining a list of periodic measurements of communication parameters amongst all nodes and brokers, such as latency and throughput. The brokers to be chosen are the two brokers minimizing the total throughput between the two nodes, the latency, or the reliability of the connection. For example, for connecting a node in the UK to a node in California, a first broker residing in AWS in the UK and a second broker in California may be selected. If a certain route has shown interruptions as logged by the controller, a different route may be selected. For example, the broker in the UK may be replaced by a broker in Ireland.

Figure 13:
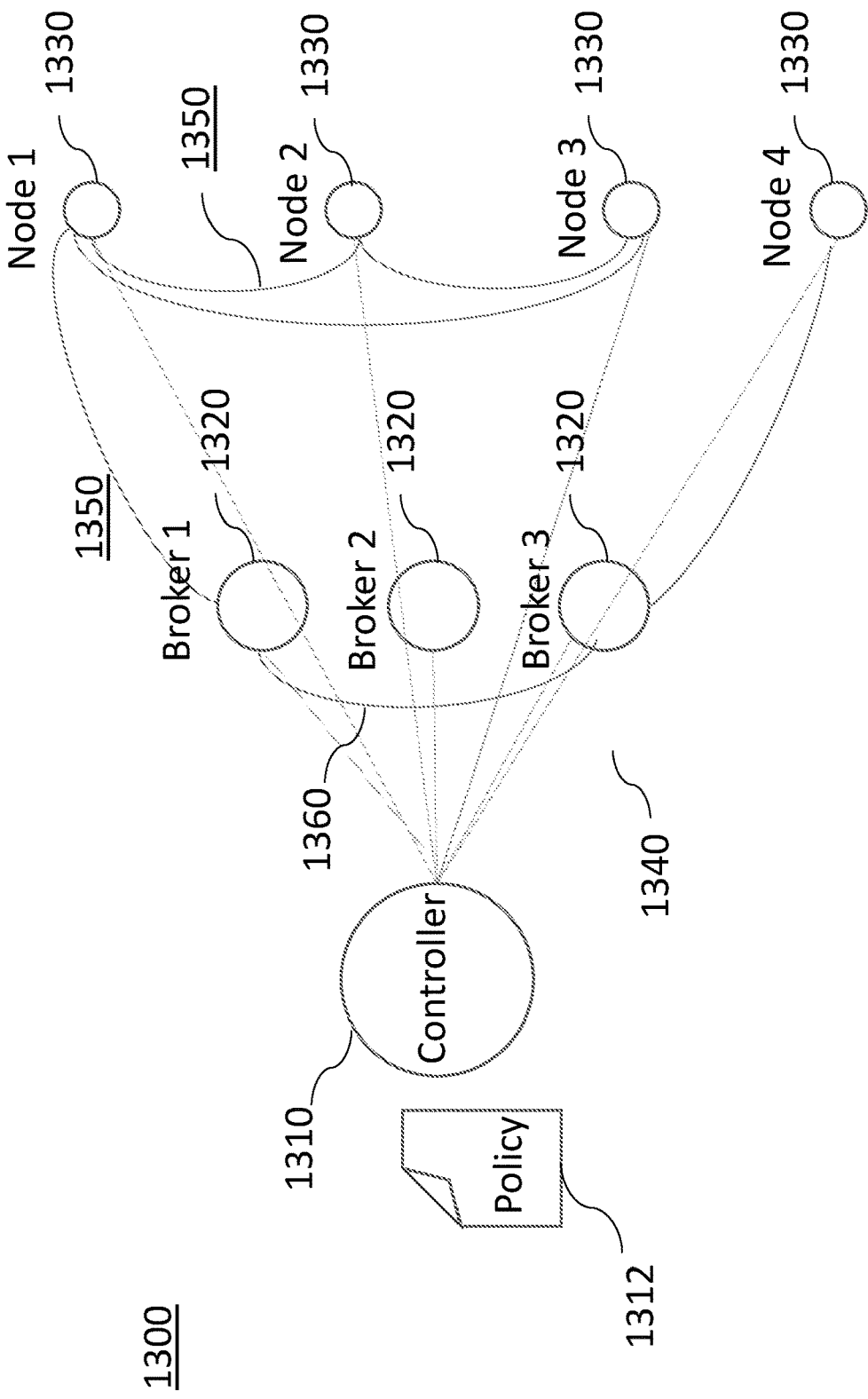
FIG. 13 is a network diagram of one embodiment of a secure overlay network acting interchangeably as a control plane and a control and data plane.

FIG. 13 is a network diagram of one embodiment of a secure overlay network acting interchangeable as a control plane and a control and data plane.

In one embodiment, the overlay network 1300 includes a controller 1310, and a policy associated with it 1312, one or more brokers 1320, as well as one or more computing devices implementing network nodes. In one embodiment, the controller 1310 and proxies 1320 are server computer systems, while the nodes 1330 are server computer systems, desktops or laptop computers, mobile devices such as smartphones and tablets, web browsers, or IoT devices. In some embodiments, controller 1310 consists of a distributed set of two or more servers.

The controller 1310, brokers 1320, and computing devices 1330 may be coupled to a network 1340 that communicates using any of the standard protocols for the secure exchange of information. In one embodiment, one or more computing devices may be coupled with the network via a wireless connection, such as a cellular telephone connection, wireless fidelity connection, etc. The computing devices and controller may run on one Local Area Network (LAN) and may be incorporated into the same physical or logical system, or different physical or logical systems. Alternatively, the computing devices and controller may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In some embodiments, the computing device 1330 communicate with the controller 1310 over a network the computing devices 1330 communicate with the controller 1310 over a network connection 1340 to determine the topology of the overlay network.

In one embodiment, the overlay network 1300 connects one or more node pairs 1330 directly via encrypted tunnels 1350, and also connected one or more nodes indirectly via one or more broker 1320 residing in a public or private cloud.

In one embodiment, the overlay network 1300 connects one or more node pairs 1330 directly via encrypted tunnels 1350, and also connect one or more nodes indirectly via one or more brokers 1320 residing in a public or private cloud. Network topology is determined by controller 1310 per policy 1312. In one embodiment, the system will attempt to create direct connection between any two nodes, and will fall back to an indirect connection whereby one more brokers act as intermediaries if connection cannot be established directly, as a result of being blocked by a firewall or a symmetric NAT device, having a non-routable IP address In one embodiment, the overlay network 1300 connects one or more node pairs 1330 directly via encrypted tunnels 1350, and also connect one or more nodes indirectly via one or more brokers 1320 residing in a public or private cloud. Network topology is determined by controller 1310 per policy 1312. In one embodiment, the system will attempt to create direct connection between any two nodes, and will fall back to an indirect connection whereby one more brokers act as intermediaries if connection cannot be established directly, as a result of having a non-routable IP address.

In some embodiments, if the policy, as may be implemented in accordance with FIG. 1 as a non-limiting example, prescribes higher throughput or quality of service (QoS), an indirect connection will be chosen if such indirect connection achieves sufficiently higher performance.

In some embodiments, determining whether an indirect connection achieves superior performance is made by having the node attempt to establish a direct connection while at the same time trying one or more indirect connections and comparing the latency, throughput and other parameters.

In some embodiments, determining whether an indirect connection achieves superior performance is made by using a predictive model based on latency and throughput information collected from all brokers and nodes periodically.

The controller 1310 may be implemented in accordance with FIG. 1 hereinabove as a non-limiting example.

The broker 1320 may be implemented in accordance with FIG. 2 hereinabove as a non-limiting example.

The nodes 1330 may be implemented in accordance with FIG. 3-6 hereinabove as a non-limiting example.

Figure 14:
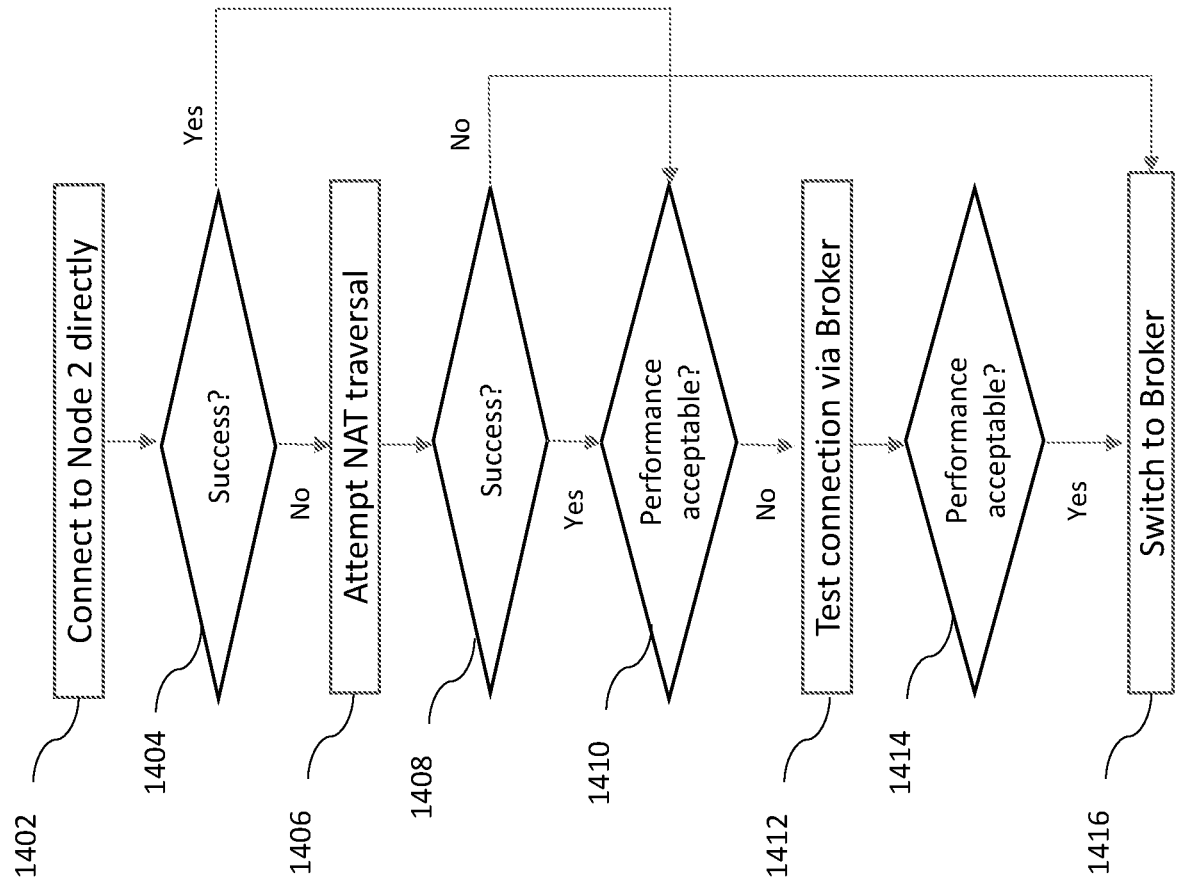
FIG. 14 is a flow diagram of how the overlay network components interact when it is acting interchangeably as a control plane and a control and data plane.

FIG. 14 is a flow chart of showing the interaction between the different components of the overlay network referenced in FIG. 13 hereinabove.

In one embodiment, an initial connection between two nodes comprises of the following steps: a first node requests from the controller to connect to a second node 1402 following the steps shown in FIG. 10 hereinabove; the node attempts to establish and connection and tests whether the connection establishment is successful 1404; if the connection failed it will attempt to perform industry standard NAT (Network Address Translation) traversal, such as STUN (Session Traversal Utilities for NAT) 1406; then test the connection again 1408; if connection failed again the node will fall back to connecting via a broker 1416 following the steps shown in FIG. 12 hereinabove; if the initial connection succeeded 1404 or NAT traversal succeeded 1408 we continue through the flow chat; the first node tests the connection performance, including but not limited to throughput and latency and compares it with the available bandwidth and desired performance per the policy 1410. if performance exceeds the performance threshold or falls below the latency threshold as determined by the policy the direct connection is maintained; otherwise, the first node concurrently tests the connection via a broker, following the same steps to establish a connection as shown in FIG. 10 hereinabove; if the performance measured through the broker is adequate or sufficiently higher as determined by policy, the connection is switched to an indirect connection 1416 going through one or more brokers and the direct connection is closed.

Figure 14A:
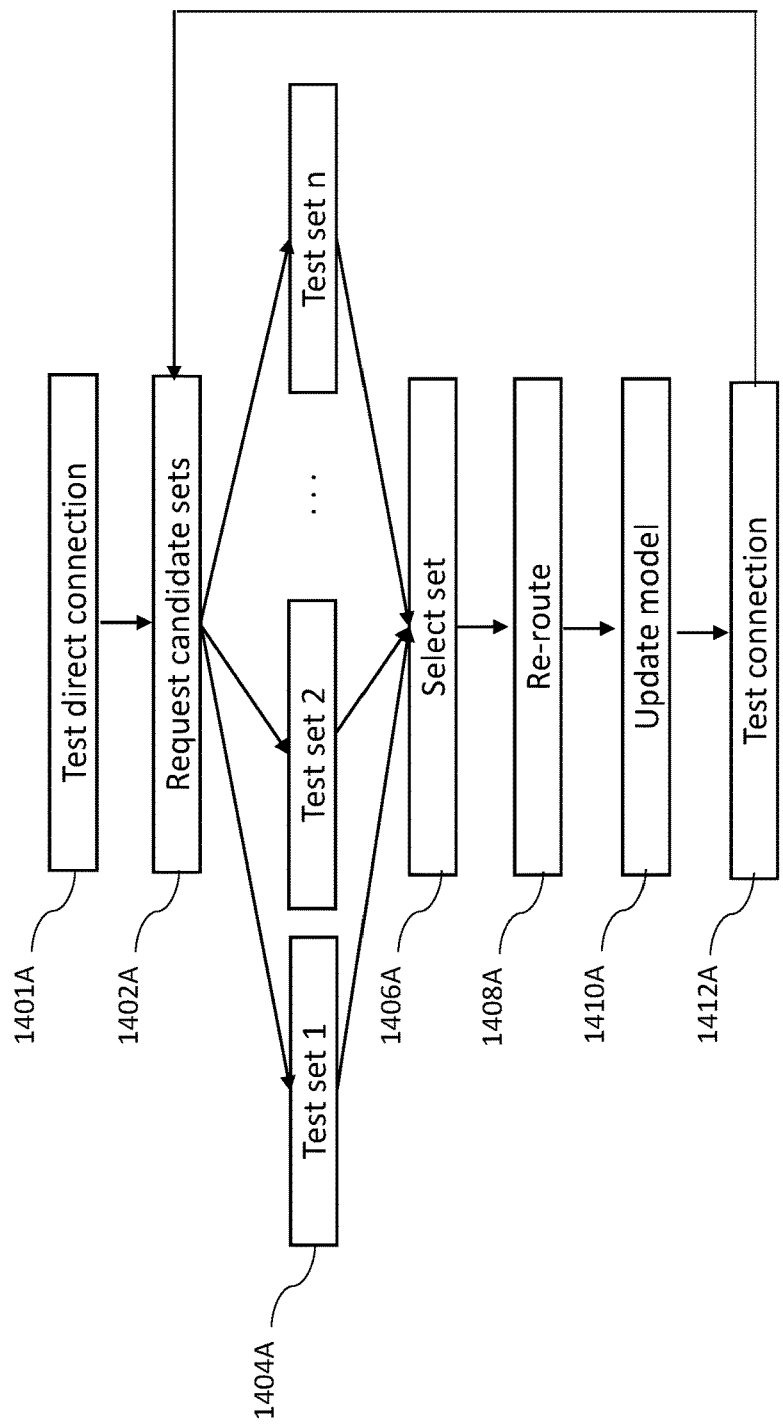
FIG. 14A is a flow diagram showing the selection of the optimal connection between two nodes.

FIG. 14A is a flow diagram showing the selection of the optimal connection between two nodes. In some embodiments selecting the optimal connection between two nodes further comprises the first node testing and initiating a direct connection to a second node 1401A while concurrently requesting a list of broker candidate sets from the controller 1402A, the controller using predictive analytics algorithms, such as clustering, K-means, or neural networks to generate a list of one or more broker candidate sets and in some embodiments connection mode recommendations in response to a vector including one or more of the IP address of the source and destination nodes, the connection protocol, the service provider details of the first and second node, and time of day. Each broker set comprises one or more brokers located in different data centers or cloud provider locations, such brokers running in one or more public cloud providers or data centers. The first node then concurrently tests the performance of the candidates 1404A by sending packets to each set of candidates as intermediate nodes between the first and second node and receiving packets back, performance measurement including one or more of throughput, latency, jitter, packet loss, or MOS score. In some embodiments, the test may also comprise of measuring additional connection modes performance including testing over multiple tunneling protocols, such as UDP and TCP-based protocols, including HTTP, HTTPS, WebRTC, SIP, and DNS, testing over multiple TCP/IP ports, testing incorporation of error correction codes such as FEC (forward error correction) with one or more parameters or other techniques to minimize packet loss, testing caching and deduplication, and testing protocol translation for specific protocols such as SMB/CIFS to other protocols. The broker set and communication mode selected 1406A are those that best meet throughput, latency, jitter, packet loss or MOS score requirements set by the policy. Upon selection, provided that such a selection scores are better than the initial direct connection score by more than a preset threshold, the client immediately forwards subsequent packets through the selected set of brokers thereby re-routing the connection 1408A over the selected set of brokers and communication modes.

In some embodiments, the client communicates to the controller the selection, and the machine learning model is then updated based on such a selection, feeding back the vector and selected route 1410A to a supervised training algorithm. The connection speed is continuously tested over the lifetime of the connection 1412A. If speed, latency, jitter or other attributes drop below a policy-defined threshold, the first node goes back to testing whether better connections exist 1402A, such connection may be a direct connection from the source node to the destination node, or a connection going through one or more brokers, re-routing the connection if a new selection is made.

Figure 15:
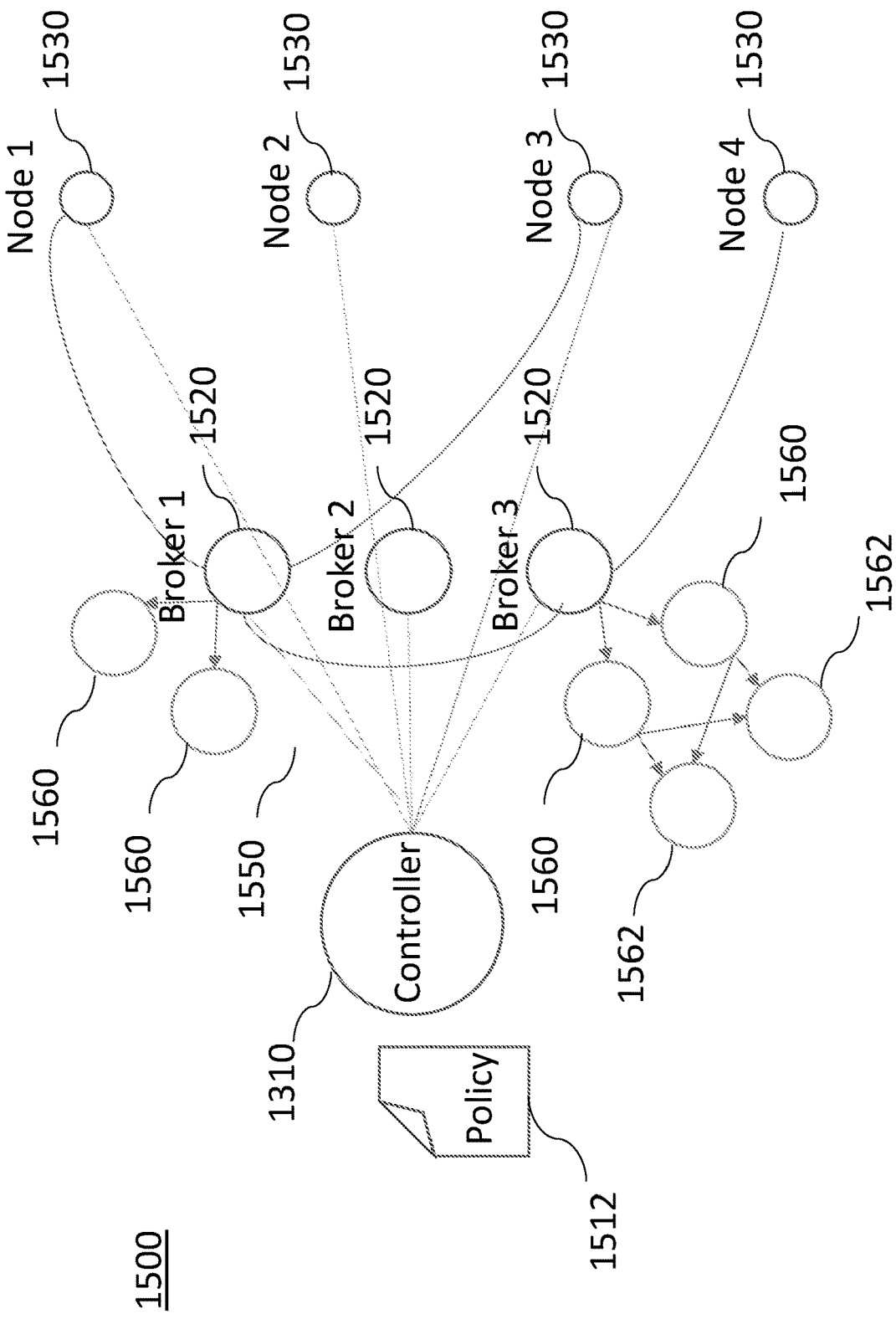
FIG. 15 illustrates one embodiment of an extensible system of network-based services.

FIG. 15 In some embodiments, network traffic originating from computing devices 1530 is routed through brokers 1520 for further inspection per the policy 1512. In some embodiments, routing and load balancing of said network traffic is performed using a framework such as Istio. The traffic is routed to nodes 1560, which perform one type of inspection, such as running an anti-virus engine, data loss prevention, or anomaly detection. In some embodiments, multiple such services, 1560 and 1562 may be chained thereby having multiple scanning engines scan the traffic. The broker may utilize its chained services connector module as shown in FIG. 2 hereinabove to connect the two nodes as a non-limiting example.

In some embodiments, based on the return code from services 1550 or 1562 the brokers may perform one or more of the following actions: allow the traffic to continue, block it, and log the return code. For example, if a virus has been detected, the broker may decide to block the connection and report the reason for blocking it.

The controller 1510 may be implemented in accordance with FIG. 1 hereinabove as a non-limiting example.

The broker 1520 may be implemented in accordance with FIG. 2 hereinabove as a non-limiting example.

The nodes 1530 may be implemented in accordance with FIG. 3-6 hereinabove as a non-limiting example.

Figure 16:
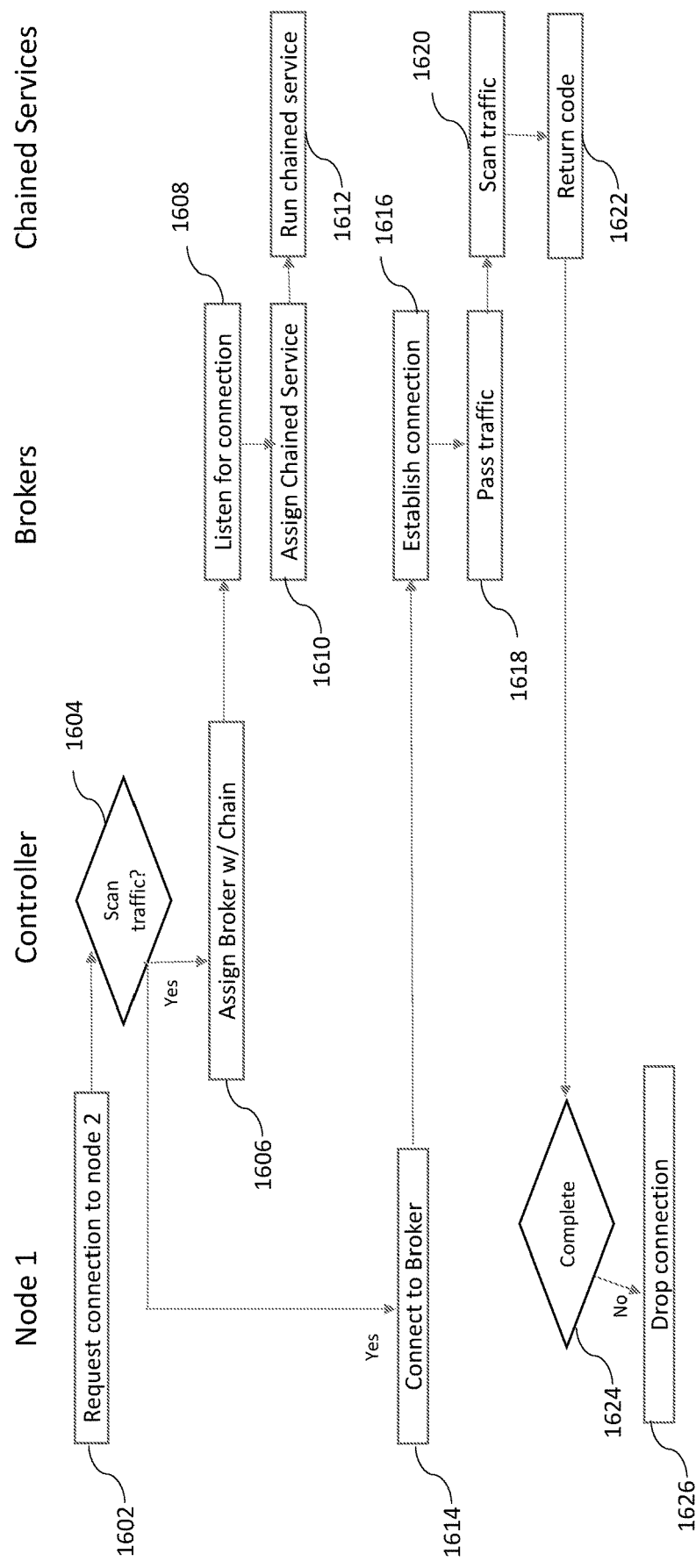
FIG. 16 is a flow diagram of how the overlay network components interact when being extended with network-based services.

FIG. 16 is a flow chart of showing the interaction between the different components of the overlay network referenced in FIG. 15 hereinabove.

In one embodiment, an initial connection between two nodes comprises of the following steps: a first node requests from the controller to connect to a second node 1602; the controller checks whether the policy requests the traffic to undergo additional scanning 1604; if additional scanning is needed the controller assigns a broker 1606 following the same steps as in FIG. 12 hereinabove; the broker listens to incoming connections from the first node 1608; the broker assigns a chained service per the policy, such as antivirus, data loss prevention that may include services such as antivirus and data loss prevention; the chained service is run 1612 as a new instance or serverless instance, or if an applicable instance is running broker may forward traffic to it; the first node connects to the broker 1614; the broker accepts the tunneled connection 1616; the broker forwards the traffic through the chained services 1618 by utilizing industry standards such as Istio or relaying traffic over standard HTTPS or similar protocols; the chained service scan the traffic 1620; the chain service returns a code indicated success or failure 1622; the first node receives the code 1624; if failure is indicated the connection is terminated 1626.

Figure 17:
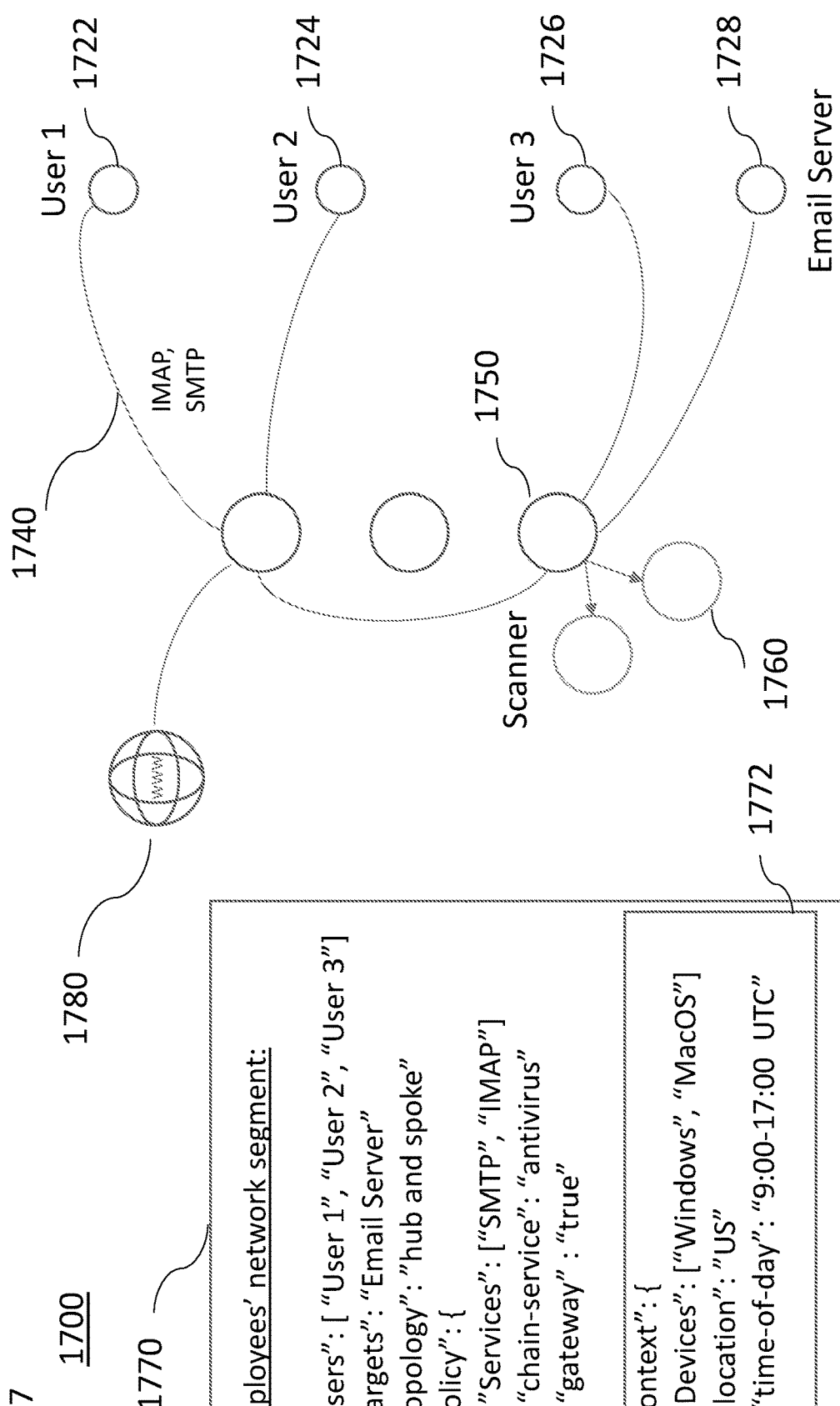
FIG. 17 illustrates one embodiment of an overlay network enforcing policy restrictions.

FIG. 17 shows that in some embodiments, the policy 1770 maintained by the controller includes a list the relationships between user identities, devices and services, along with restrictions, and actions. Restrictions and actions may include what protocols may be used on the network, or what additional services should be chained to the communication path. For example, users 1722, 1724, 1726 may communicate freely directly or over the network 1730 using SMTP and IMAP protocols, with email server 1728 for email service over network 1740 via a broker 1750.

Each node 1724 may independently enforce the policies restrictions pertaining to the allowed services and connections based the policy communicated to it from the controller. The nodes may utilize their policy enforcement module as shown in FIGS. 3, 4 and 6 hereinabove to enforce such policy restrictions as a non-limiting example. In some embodiments, policy rule evaluation is made according to rule priority, such as rule order. In case two rules are contradictory (for example, one rule allows all protocols and one blocks FTP) the policy enforcement traverses the rules by order of priority and the higher priority rule wins.

In some embodiments one or more of the above policies 1770 may be associated with a 'context' object 1772. The context may be implemented for example in accordance with FIG. 8 as a non-limiting example. Each node can further enforce contextual access restrictions based on the policy communicated to it from the controller. The nodes may utilize their policy enforcement module as shown in FIGS. 3, 4 and 6 hereinabove to enforce such additional restrictions as a non-limiting example.

In some embodiments, as per the policy, traffic is optionally forwarded by a broker 1750 to a scanner service 1760 for inspection, such as antivirus or data loss prevention service, and then returned and forwarded onwards to second computing device. If scanner service detects an issue, broker 1750 terminates said connection.

In some embodiments, as per policy, a broker acts as a gateway to capture traffic and forward it to one or more computing devices residing on the wide area network (WAN) 1780, such as Internet web sites or Saas (Software as a Service) services.

In some embodiments, traffic forwarded for inspection 1760 or to the WAN 1780 requires respective broker or gateway to terminate encryption and forward said traffic in plaintext to the scanning service or to a destination computing device.

FIG. 18 is a workflow describing the initial connection of a computing device onto the overlay network.

In some embodiments, the first step involves a computing device attempting to connect to a second computing device over a network, whereas the network may be a local area network (LAN) or a wide area network (WAN). In some embodiments, a local agent or a gateway device captures said connection as may be implemented in accordance with FIGS. 3, 5 and 6 hereinabove as a non-limiting example. Since it is the first connection, the agent or gateway will require identity to be established. In some embodiments, this is accomplished by implementing standard SAML authentication comprising of the agent connecting to the controller 1812 requesting a connection to be established, the controller verifying the agent's certificate 1812, verification implemented by the controller's identity connector module as shown in FIG. 1 as a non-limiting example, and if verified 1814 redirecting the agent to display a captive portal pop-up 1616, followed by the agent prompting the user for credentials 1818 through the captive portal, the agent then requesting single sign on (SSO) using industry standard SAML 1820 from an identity provider (IDP) 1822, the IDP responding 1824 and returning a token, and if authenticated 1826 requesting access to a network resource from the controller 1828, the controller further verifying the token previously obtained 1830, and if verified stores the node IP address and presence information in the database 1832 for future lookup by any node on the overlay network, and generates a second token 1834 returned to the agent, at which time the agent can use it to establish a connection 1836 as previously described in FIGS. 10 and 12 hereinabove. In other embodiments, credentials may be automatically acquired from the computing device's operating system via industry standard methods such as the use of a client-side certificate, without requiring user intervention. The credentials are then sent to an identity management system (IDP) that authenticates the user 1814. Once authenticated 1816 the controller checks whether this identity is authorized per its policy 1818. If so, it allows the connection to be established 1822. In some embodiments, it generates a token or encryption keys 1820 that allow the computing device to communicate with the network service.

In some embodiments, establishing an identity of a headless or gateway node may be implemented in accordance with FIG. 4 hereinabove as a non-limiting example, comprising of the use of a certificate or token residing on said node, the use of FIDO or other standard methods, replacing the interactive captive portal 1818 by communicating said token without requiring user intervention.

In some embodiments, encryption keys are randomly generated by the controller and are unique to each pair of computing devices establishing a connection.

Figure 19:
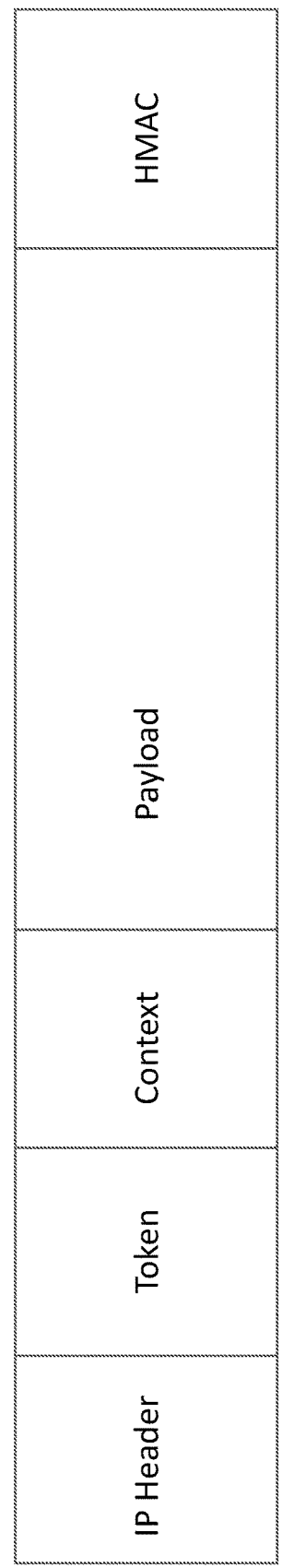
FIG. 19 is a block diagram of one embodiment of a packet comprising a secure tunnel.

FIG. 19 shows a non-limiting example of an implementation which, in some embodiments, features an IP-based network tunneling protocol. The protocol is preferably implemented to include frames consisting of an IP header, the sender's identity, a context (an identifier of the sender's association), the payload of the original packet, and an HMAC. This payload is encrypted. The identity and context are used in conjunction with the policy to determine whether any two nodes are allowed to connect, based on a company's policy.

Figure 20:
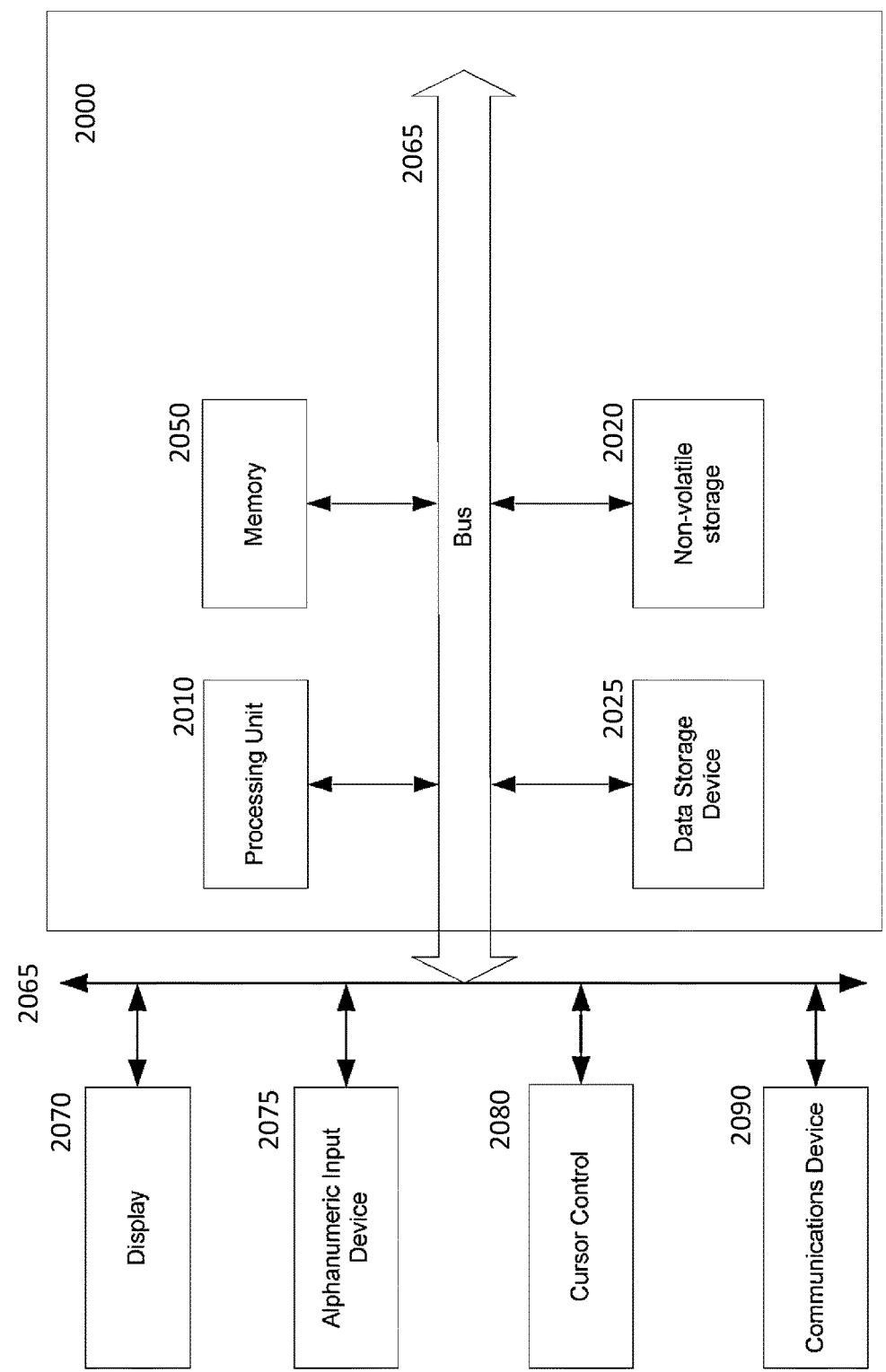
FIG. 20 is a block diagram of one embodiment of a computer system that may be used with the present invention.

FIG. 20 is one embodiment of a computer system on which the present invention may be implemented. It will be apparent to those of ordinary skill in the art, however, that other alternative systems of various system architectures may also be used. Optionally such a computer system may be used with any of the edge, node, controller, broker or other computational devices. Each such computational device may comprise a plurality of such a system. The instructions for performing the various functions as described herein may for example be stored on a memory as described herein and executed by a processor as described herein.

The data processing system illustrated in FIG. 20 includes a bus or other internal communication means 2065 for communicating information, and a processor 2060 coupled to the bus 2065 for processing information. The system further comprises a random access memory (RAM) or other volatile storage device 2050 (referred to as memory), coupled to bus 2065 for storing information and instructions to be executed by processor 2060. Main memory 2050 also may be used for storing temporary variables or other intermediate information during execution of instructions by processor 2060. The system also comprises a read only memory (ROM) and/or static storage device 2020 coupled to bus 2065 for storing static information and instructions for processor 2060, and a data storage device 2025 such as a magnetic disk or optical disk and its corresponding disk drive. Data storage device 2025 is coupled to bus 2065 for storing information and instructions.

The system may further be coupled to a display device 2070, such as a cathode ray tube (CRT) or a liquid crystal display (LCD) coupled to bus 2065 through bus 2065 for displaying information to a computer user. An alphanumeric input device 2075, including alphanumeric and other keys, may also be coupled to bus 2065 through bus 1865 for communicating information and command selections to processor 2060. An additional user input device is cursor control device 2080, such as a mouse, a trackball, stylus, or cursor direction keys coupled to bus 2065 through bus 2065 for communicating direction information and command selections to processor 2060, and for controlling cursor movement on display device 2070.

Another device, which may optionally be coupled to computer system 2000, is a communication device 2090 for accessing other nodes of a distributed system via a network. The communication device 2090 may include any of a number of commercially available networking peripheral devices such as those used for coupling to an Ethernet, token ring, Internet, or wide area network. The communication device 2090 may further be a null-modem connection, or any other mechanism that provides connectivity between the computer system 2000 and the outside world. Note that any or all of the components of this system illustrated in FIG. 18 and associated hardware may be used in various embodiments of the present invention.

It will be appreciated by those of ordinary skill in the art that any configuration of the system may be used for various purposes according to the particular implementation. The control logic or software implementing the present invention can be stored in main memory 2050, mass storage device 2025, or other storage medium locally or remotely accessible to processor 2060.

It will be apparent to those of ordinary skill in the art that the system, method, and process described herein can be implemented as software stored in main memory 2050 or read only memory 2020 and executed by processor 1860. This control logic or software may also be resident on an article of manufacture comprising a computer readable medium having computer readable program code embodied therein and being readable by the mass storage device 2025 and for causing the processor 860 to operate in accordance with the methods and teachings herein.

The present invention may also be embodied in a handheld or portable device containing a subset of the computer hardware components described above. For example, the handheld device may be configured to contain only the bus 2065, the processor 2060, and memory 2050 and/or 2025. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 2060, a data storage device 2025, a bus 2065, and memory 2050, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 2060. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, etc.

In the description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "providing", "generating", "propagating", "distributing", "transmitting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Whereas many alterations and modifications of the present invention will no doubt become apparent to a person of ordinary skill in the art after having read the foregoing description, it is to be understood that any particular embodiment shown and described by way of illustration is in no way intended to be considered limiting.

Therefore, references to details of various embodiments are not intended to limit the scope of the claims which in themselves recite only those features regarded as essential to the invention.

What is claimed is:

1. A system comprising:
   a controller computational device, and
   a plurality of node computational devices including first and second nodes, and communicating with said controller computational device and through a computer network,
   the first node allowed to communicate with the second node when such communication is permitted per a policy maintained by the controller;
   if when communication is permitted, the first node attempting to establish a tunnel to the second node to use for said communication;
   when the first node fails to establish the tunnel, the first node attempting to perform NAT (Network Address Translation) traversal; and
   when said NAT traversal fails, the first node sending a request to the controller to assign one or more broker computational devices to relay communication between the first node and the second node.

2. The system of claim 1, wherein:
   each node comprises a policy enforcement module and a policy determined according to a controller policy on said controller,
   and communications to and from each node are blocked unless permitted by said policy enforcement module according to said policy.

3. The system of claim 2, wherein context is associated with the policy, such context restricting traffic between nodes unless it matches said context, said context comprising of one or more of node device type, node device posture, node operating system and software versions, node geolocation, node geo-IP (Internet Protocol), time of day, and node strength of authentication.

4. The system of claim 1, wherein:
   said tunnel implements an encryption protocol,
   said first node is only allowed to communicate with said second node over said tunnel if said controller distributes keys or tokens compatible with said encryption protocol,
   said tunnel implements a UDP (User Datagram Protocol) or IP (Internet Protocol)-based protocol, and
   said tunnel implements a protocol that comprises of the originating user identity and context.

5. The system of claim 4 further comprising a plurality of tunnels, wherein:
   one or more tunnels constitute an overlay network, and
   some or all network communications by member nodes are restricted to communication through said tunnels, such that each node is visible to another node as being responsive for communication if and only if the two nodes reside on the same overlay network.

6. The system of claim 5, wherein said tunnels are transient and are established when one node initiates authorized communication with another node.

7. The system of claim 6, wherein:
   a second tunnel connects the first node to the second node through said broker computational devices, and
   each broker computational device acts as a gateway that connects through the second tunnel to the first node and forwards node traffic to the second node residing on a WAN.

8. The system of claim 7, wherein the second node comprises a Saas (Software as a Service) service.

9. The system of claim 8, wherein:
   the first node communicates with a particular broker through the second tunnel, and
   said particular broker forwards said node traffic to one or more chained services and then forwards said node traffic to the second node.

10. The system of claim 9, wherein said controller determines whether to route traffic through said particular broker according to at least one of a traffic quality requirement, a bandwidth requirement, a network routing requirement or a security requirement.

11. The system of claim the first node to the particular broker, such that no inbound communications are allowed to the first node and all inbound communication to the first node is only allowed through said particular broker.

12. The system of claim 11, wherein:
the controller selects the location of one or more brokers based on a predictive algorithm so as to optimize one or more of network throughput, latency or traffic quality, and
for each connection between a pair of nodes and given a vector including the connection quality, nodes' locations, network carriers, communications protocol, and time of day:
  a particular node of the pair of nodes periodically requests connection options from the controller;
  the controller responds to the particular node with one or more broker candidate sets and communication modes;
  the particular node concurrently tests connection quality traversing candidate set brokers in response to one or more communication modes to select a best set of brokers;
  the particular node forwards subsequent packets through the selected broker set; and
  the particular node communicates the broker set selection back to the controller, wherein the broker candidate sets are generated by the controller based on a predictive model that is refined based on the selection of broker sets selection by the particular node.

13. The system of claim 12, wherein:
the first node connects to the second node using at least one of a user identity and an associated device identity,
each identity comprises a node label, and
said controller resolves said node labels into underlying IP addresses to provide IP-level routing and communication.

14. The system of claim 13, wherein the controller further comprises an identity connector, wherein:
when the second node is not a headless node, the identity connector establishes the user identity by:
  preventing all outbound traffic going to each overlay network until its originating user identity is established;
  displaying a captive portal to receive user credentials;
  sending user credentials to an identity provider system for authentication; and
  retrieving the user identity; and
when the second node is a headless node, the identity connector establishes the user identity by:
  preventing all outbound traffic going to each overlay network until at least one of its originating user and originating device identity is established;
  retrieving a certificate or token from said headless node computing device;
  verifying the retrieved certificate or token with an identity provider compatible with the retrieved certificate or token; and
  retrieving at least one of the user identity and device identity.

15. The system of claim 14, wherein said headless node implements Envoy for connecting to a cloud-based system and Istio for connecting to a Kubernetes or serverless system.

16. The system of claim 15 further comprising a gateway node, wherein said gateway node is one of (i) a virtual gateway that connects to a network of cloud instances, a VPC (Virtual Private Cloud), or a subnet, or (ii) a physical gateway computing device or appliance that resides on a same network as the first or second node, intercepts all inbound and outbound traffic, and encapsulates traffic inside the second tunnel and enforces a policy on said inbound and outbound traffic.

17. The system of claim 16, wherein one of the first and second nodes is a clientless node, and said tunnel and policy enforcement is implemented inside a browser or via a streaming module.

18. The system of claim 1, wherein:
said controller comprises a processor and a memory,
said processor is configured to perform a defined set of basic operations in response to receiving a corresponding basic response to receiving a corresponding basic instruction selected from a defined native instruction set of codes,
a first set of machine codes selected from the defined native instruction set of codes relates to processing of inbound network requests from said nodes,
a second set of machine codes selected from the defined native instruction set of codes relates to determining of responses to said inbound network requests according to said policy, and
a third set of machine codes selected from the defined native instruction set of codes relates to sending of responses to system components in accordance with the policy, and
said first, second and third sets of machine codes are stored on said memory.

19. The system of claim 1, wherein:
the first node comprises a processor and a memory,
said processor is configured to perform a defined set of basic operations in response to receiving a corresponding basic response to receiving a corresponding basic instruction selected from a defined native instruction set of codes,
a first set of machine codes selected from the defined native instruction set of codes relates to processing of a first request to connect with the second node for communication,
a second set of machine codes selected from the defined native instruction set of codes relates to processing of a second request to transmit information to and/or receive information from the second node,
a third set of machine codes selected from the defined native instruction set of codes relates to comparing said first and second requests to said policy and permitting said first and second requests when such first and second requests are permitted by said policy, and
said first, second and third sets of machine codes are stored on said memory.

* * * * *